United States Patent
Ford et al.

(10) Patent No.: US 10,037,585 B2
(45) Date of Patent: Jul. 31, 2018

(54) SYSTEMS AND METHODS FOR MANAGING TABLE AND SEATING USE IN COMMERCIAL ESTABLISHMENTS

(71) Applicant: Agilysys NV, LLC, Alpharetta, GA (US)

(72) Inventors: Andrew Ford, New York, NY (US); James Ford, Goleta, CA (US); Narisa Wild, Larchmont, NY (US)

(73) Assignee: Agilysys NV, LLC, Alpharetta, GA (US)

( * ) Notice: Subject to any disclaimer, the term of this patent is extended or adjusted under 35 U.S.C. 154(b) by 626 days.

(21) Appl. No.: 14/194,384

(22) Filed: Feb. 28, 2014

(65) Prior Publication Data

US 2014/0244324 A1    Aug. 28, 2014

Related U.S. Application Data

(60) Provisional application No. 61/770,467, filed on Feb. 28, 2013.

(51) Int. Cl.
  *G06Q 50/12*    (2012.01)
  *G06Q 10/02*    (2012.01)
(52) U.S. Cl.
  CPC .......... *G06Q 50/12* (2013.01); *G06Q 10/02* (2013.01)
(58) Field of Classification Search
  CPC ........ G06Q 50/12; G06Q 10/02; G06Q 50/10; G06Q 30/0205; G06Q 50/01; G06Q 30/06; G06Q 10/06; G06Q 30/02; G06Q 10/1095

See application file for complete search history.

(56) References Cited

U.S. PATENT DOCUMENTS

| | | | | |
|---|---|---|---|---|
| 2013/0325526 A1* | 12/2013 | Tyler | ...................... | G06Q 10/02 705/5 |
| 2013/0332208 A1 | 12/2013 | Mehta | | |
| 2014/0156319 A1* | 6/2014 | Deeb | ...................... | G06Q 30/06 705/5 |

OTHER PUBLICATIONS

Bond, "New Apple patent hints the company may be entering the restaurant-reservation market," Dec. 16, 2013, www.tuaw.com (5 pages).

* cited by examiner

*Primary Examiner* — Maroun P Kanaan
(74) *Attorney, Agent, or Firm* — Perkins Coie LLP

(57) ABSTRACT

Computerized systems and methods are provided for allocating and managing table and seating inventory at commercial establishments, such as restaurants. In one implementation, a computer-implemented method receives a first request to allocate table inventory at a commercial establishment. In some aspects, the first request may include a first party size and a first requested time. Based on a received request, the method may determine a mode of allocation associated with the commercial establishment. The method may identifying one or more first units of table inventory capable of accommodating the first party size at the first requested time. In certain aspects, the identification may be based on at least the determined allocation mode.

17 Claims, 16 Drawing Sheets

Dashboard

Free tables by party size

Party Size

| utilization | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Pass... | X % | X | X | X | X | X | X | . | . | . | . | . | . | . | . | . | . | . | . | . | . |
| Aca... | X % | X | X | X | X | . | . | . | . | . | . | . | . | . | . | . | . | . | . | . | . |
| Celia | X % | X | X | X | X | X | X | . | . | . | . | . | . | . | . | . | . | . | . | . | . |

Wait time by party size

Party Size

| Average wait time | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Pass... | X m | Xm | Xm | Xm | Xm | Xm | Xm | . | . | . | . | . | . | . | . | . | . | . | . | . | . |
| Aca... | X m | Xm | Xm | Xm | Xm | . | . | . | . | . | . | . | . | . | . | . | . | . | . | . | . |
| Celia | X m | Xm | Xm | Xm | Xm | Xm | Xm | . | . | . | . | . | . | . | . | . | . | . | . | . | . |

FIG. 7G

SYSTEMS AND METHODS FOR MANAGING TABLE AND SEATING USE IN COMMERCIAL ESTABLISHMENTS

CROSS-REFERENCE TO RELATED APPLICATION(S)

This application claims the benefit of priority to U.S. Provisional Patent Application No. 61/770,467, filed Feb. 28, 2013, the entire disclosure of which is expressly incorporated herein by reference to its entirety.

BACKGROUND

Technical Field

The present disclosure generally relates to computerized systems and methods allocating and managing tables, seats, and other resources within of a commercial establishment.

Background Information

Commercial establishments, such as restaurants, bars, sporting venues, and performance venues, use various mechanisms to allocate and manage seating and table inventory. For example, a restaurant may create a table configuration (e.g., a floor plan) that includes ten tables with seating for two customers per table, ten tables with seating for four customers per table, and five tables with seating for eight customers per table. Despite the complexities in such floor plans, many restaurants continue to manage reservations and waitlists by manually estimating turnover and selecting available tables for assignment to parties. These manual processes, even when enhanced by computers, may result in an inefficient allocation of resources, which may frustrate customers, restaurant employees, and restaurant management.

SUMMARY

Consistent with embodiments of the present disclosure, a computer-implemented method receives a first request to allocate table inventory at a commercial establishment. In certain aspects, the first request includes a first party size and a first requested time. Based on the received request, the method may determine an allocation mode associated with the commercial establishment. The method may identify one or more first units of table inventory capable of accommodating the first party size at the first requested time. In some aspects, the identification may be based on at least the determined allocation mode.

Consistent with further embodiments of the present disclosure, an apparatus is provided that includes a storage device and at least one processor coupled to the storage device. The storage device stores a set of instructions for controlling the at least one processor, and the at least one processor, being operative with the set of instructions, is configured to receive a first request to allocate table inventory at a commercial establishment. In certain aspects, the first request includes a first party size and a first requested time. Based on the received request, the at least one processor may be further configured to determine an allocation mode associated with the commercial establishment. The at least one processor may further configured to identify one or more first units of table inventory capable of accommodating the first party size at the first requested time. In some aspects, the identification may be based on at least the determined allocation mode.

Other embodiments of the present disclosure relate to a tangible, non-transitory computer-readable medium that stores a set of instructions that, when executed by at least one processor, perform a method that includes receiving a first request to allocate table inventory at a commercial establishment. In certain aspects, the first request includes a first party size and a first requested time. Based on the received request, the method may determine a mode of allocation associated with the commercial establishment. The method may identify one or more first units of table inventory capable of accommodating the first party size at the first requested time. In some aspects, the identification may be based on at least the determined allocation mode.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

BRIEF DESCRIPTION OF THE DRAWINGS

FIGS. 7A-7G, 8, and 9 illustrate portions of exemplary graphical user interfaces, according to embodiments of the present disclosure.

DETAILED DESCRIPTION OF EXEMPLARY EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as ell as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

The disclosed embodiments relate to computer-implemented systems and methods that enable a commercial establishment to adaptively allocate and manage table inventory, seating inventory, and other resources. In one aspect, the commercial establishment may include a restaurant. In such instances, the disclosed table management techniques may also enable the restaurant to efficiently allocate tables and seats based on factors that include, but are not limited to, a time of day, a party size, estimated turnaround times for the party size, table status and hold information, rate limits for the restaurant, server section usage and turnover time, point-of-sale (POS) information, and preferences and attributes of various customers. The disclosed embodiments are, however, not limited to restaurants, and in additional embodiments, the disclosed embodiments may enable other commercial establishments, such as bars, sporting arenas, and performance venues, to effectively allocate and manage table inventory, seat inventory, and other resources.

Figure 1:
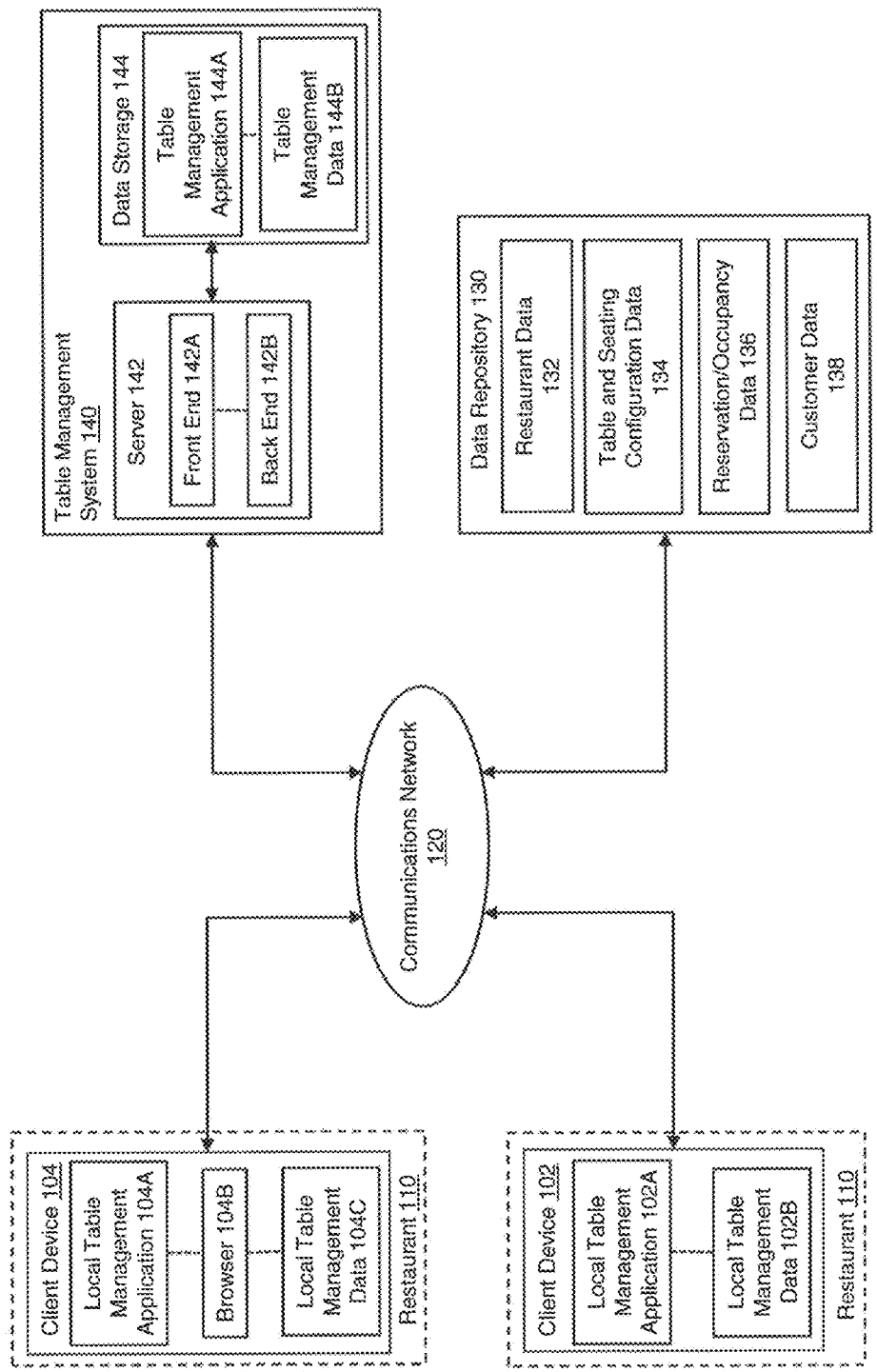
FIG. 1 is a diagram of an exemplary computing environment within which embodiments of the present disclosure may be practiced.

FIG. 1 illustrates an exemplary computing environment 100 within which embodiments consistent with the present disclosure may be practiced. The number and arrangement of components in computing environment 100 are exemplary and presented for purposes of illustration. Additions, substitutions, and modifications may be made to these components, consistent with the teachings and embodiments of the present disclosure.

In FIG. 1, environment 100 includes a communications network 120 that interconnects client devices 102 and 104, a data repository 130, and a table management system 140.

Communications network 120 may be implemented with any form or medium of digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"), e.g., the Internet. Consistent with embodiments of the present disclosure, network 120 may comprise the Internet and include any publicly-accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow user devices, such as user devices 102 and 104, to send and receive data via applicable communications protocols, including those described above.

Client devices 102 and 104 may be implemented using an apparatus with at least one processor or a computer-based system, which may execute software instructions to provide table and seating management and allocation services at a commercial establishment (e.g., a restaurant 110). For example, client devices 102 and 104 may include, but are not limited to, a personal computer, a laptop computer, a notebook computer, a hand-held computer, a personal digital assistant, a mobile phone, a smart phone, a tablet computer, a wearable computing device (e.g., a smart watch or a wearable eyewear-based computing device), an embedded computing device, and any additional or alternate computing device operable to transmit and receive data across network 120.

In one embodiment, a user of client device 102 may execute a native application (e.g., local table management application 102A) to provide table and seating management services to restaurant 110. Further, in additional embodiments, a user of client device 104 may provide similar table and seating management services to restaurant 110 by executing local table management application 104A through an instance of a web browser 104B. In certain aspects, local table management application 104A may include one or more Hyper Text Markup Language (HTML) files, eXtensible Markup Language (XML) files, JavaScript files, SWF files of Microsoft Silverlight™-compatible rich Internet application files, or files having any other format or combination of formats compatible with web browser 104B. For example, web browser 104B may include a Microsoft Silverlight™ plugin media player that provides an application framework for executing local table management application 104A when provided as a Microsoft Silverlight™-compatible rich Internet application. In such instances, web browser 104B may provide the visual appearance and interactive functionality of the local table management application 104A.

In certain aspects, local table management applications 102A and 104A may leverage locally stored restaurant data, table/seating configuration data, reservation data, and customer data to provide table and seating management services to restaurant 110. For example, local table management applications 102A and 104A may leverage local table management data 102B and 104C stored on corresponding client devices 102 and 104 to provide the disclosed table and seating management services. In other aspects, however, local table management applications 102A and 104A may exchange information with data repository 130 and/or a table management application executed by table management system 140 (e.g., table management application 144A) through calls to corresponding application programming interfaces (APIs).

Data repository 130 may include one or more data storages configured to store information consistent with the disclosed embodiments. For example, data repository 130 may include restaurant data 132, table and seating configuration data 134, reservation/occupancy data 136, and customer data 138. In certain aspects, table management system 140 and client devices 102 and 104 may leverage restaurant data 132, table and seating configuration data 134, existing reservation data 136, and customer data 138 to perform table management and allocation processes consistent with the disclosed embodiments.

In one aspect, restaurant data 132 may include information identifying one or more restaurants, and further, information identifying one or more table management parameters. For example, restaurant data 134 may include information identifying restaurant 110 (e.g., a name), information identifying characteristics of restaurant 110 (e.g., a type of cuisine or a noise level within restaurant 110), and street addresses and contact information for restaurant 110. Further, in certain aspects, restaurant data 144 may also include one or more table management parameters for restaurant 110. Table management parameters consistent with the disclosed embodiments include, but are not limited to, a mode for allocating tables and seats (e.g., a manual or automated slotting mode), rate-limiting parameters, server shift data, and periods during which restaurant 110 is closed or otherwise unavailable for reservation. Further, restaurant data 132 may also include historical data indicating turnaround times for parties of various sizes over corresponding periods (e.g., one month, six months, or one year). The disclosed embodiments are, however, not limited to such exemplary information, and in further embodiments, restaurant data 132 may include any additional or alternate parameters that enable client device 102, client device 104, and table management system 140 to provide table management services to restaurant 110.

Table and seating configuration data 134 may, in certain embodiments, include information identifying current table and seating configurations within the various seating areas of the one or more restaurants. By way of example, for restaurant 110, table and seating configuration data 134 may include informational allowing client device 102 and 104 to render and present a graphical representation of a layout of tables within a corresponding seating area, and further, a configuration of seats at each of the tables (e.g., a corresponding restaurant floor plan). Further, in certain aspects, restaurant 110 may have multiple seating areas (e.g., indoor areas configured for smaller tables and larger tables, and an outdoor patio area suitable for use in warmer months). In some embodiments, table and seating configuration data 134 may include information identifying layouts of tables and corresponding seating configurations for each of the multiple seating areas.

Reservation/occupancy data 136 may also include information identifying reservations booked at the one or more restaurants. By way of example, reservation data 136 may include, for restaurant 110, each established reservation within a corresponding time period (e.g., one year), along with contact information for a representative customer (e.g., a name, email address, and/or telephone number), corresponding reservation times, corresponding party sizes, and tables assigned to the reservation.

In additional embodiments, reservation/occupancy data 136 may also include information identifying current occupancies of tables and seats in the one or more restaurants. For example, reservation/occupancy data 136 may include, for restaurant 110, information identifying one or more tables currently occupied by customers, and further, a number of occupied seats at the tables. Reservation/occupancy data 136 may also include information identifying current waitlists for the one or more restaurants, including, but not limited to, contact information for the parties on the waitlists, sizes of the parties, positions of the parties on the waitlist, tables assigned to the parties, and waitlist times associated with the parties.

In other aspects, reservation/occupancy data 136 may include information identifying standby lists for the one or more restaurants. By way of example, a standby list for restaurant 110 may indentify parties interesting in dining at restaurant 110 on specific dates and times for which restaurant 110 has no current availability (e.g., the restaurant may be booked during the specific times and dates). In such instances, the standby list for restaurant 110 may include, but is not limited to, contact information for the parties, sizes of the parties, positions of the parties on the standby list, and dates and times of interest to the parties.

In an embodiment, customer data 138 may include information identifying past and current customers of the one or more restaurants, and further, information identify the customers' prior history of reservations at the one or more restaurants. For example, the customer data may include contact information (e.g., email and/or telephone numbers) for the customers, addresses of the customers, and/or images of the customers. Further, in certain aspects, customer data 138 may identify a status associated with the past and current customers. For example, customer data 138 may identify an enhanced status of a customer (e.g., a "VIP" status), which may result from the customer's establishment of a threshold number of reservations, establishment of reservations at a threshold number of participating restaurants, submission of reviews for a threshold number of restaurants, or in accordance with any additional or alternate metric.

Referring back to FIG. 1, table management system 140 may include one or more computer systems and servers configured to process and store information, and execute software instructions to perform one or more table management processes consistent with the disclosed embodiments. In certain aspects, table management system 140 may include a server 142 (e.g., a "table management server") and a data storage 144. Table management server 142 may include a front end 142A, and a back end 142B, which is disposed in communication with front end 142A. In the exemplary embodiment of FIG. 1, front end 142A and back end 142B of table management server 142 may be incorporated into a hardware unit, for example, a single computer, a single server, or any additional or alternate computing device apparent to one or skill in the art. Further, in other embodiments, front end 142A may be a software application, such as a web service, executing on server 142. However, table management server 142 is not limited to such configurations, and, in additional embodiments, front end 142A may be executed on any computer or server separate from back end 142B.

Data storage 144 may include one or more data storage devices configured to store information consistent with the disclosed embodiments. In some embodiments, local data repository 144 may include a table management application 144A and table management data 144B. Table management server 142 may, in certain aspects, access table management data 144B and execute table management application 144A to provide table management services to one or more restaurants (e.g., restaurant 110).

In one embodiment, table management application 144A may expose API functions that called by other table management applications, such as local table management applications 102A and 104A executed by client device 102 and 104. For example, local table management application 102A may access information stored locally at table management server 142 (e.g., within local table management data 144B) through a call to a corresponding API. Additionally or alternatively, local table management application 102A may, through a call to a corresponding API, request performance one or more table management functions by table management server 142, such as a determination of available reservation slots at a corresponding restaurant.

Although client devices 102 and 104 are associated with restaurant 110 in FIG. 1, the disclosed embodiments are not limited to such exemplary configurations. In additional embodiments, computing environment 100 may include a plurality of client devices associated with additional restaurants, bars, and other commercial establishments and configured to execute table management applications that, either alone or in conjunction with table management server 142, provide table management services.

Further, in additional embodiments (not depicted in FIG. 1), computing environment 100 may include one or more additional client devices associated with individual users. By way of example, a user may execute a web browser on a client device in communications with network 120, and may access a web page associated with restaurant 110 to request a reservation or spot on a waitlist and/or standby list through a corresponding API. Additionally or alternatively, the user may access a web page or interface of a third-party application (e.g., a social media application), and may request to request a reservation or spot on a waitlist and/or standby list through an additional API, plug-in, or widget associated with table management system 140. Further, in additional embodiments, the user may leverage the client device to transmit an email message or a text message to table management system 140 requesting a reservation at restaurant 110, a waitlist spot for an available table at restaurant 110, or a spot on the standby list for restaurant 110.

Similarly, although computing environment 100 is illustrated in FIG. 1 with a single data repository 130 and a single table management system 140, persons of ordinary skill in the art will recognize that environment 100 may include any number of additional systems 140 and data repositories 130. Additionally, although illustrated as a separate component of environment 100, persons of ordinary skill in the art will recognize that data repository 130 may be incorporated into one or more additional components of environment 100, such as table management system 140. Further, as noted above, the arrangement of these components may be modified or otherwise altered from that illustrated in FIG. 1, according to the needs or requirements of the system.

Further, in certain embodiments, one or more of client device 102, client device 104, data repository 130, and table management server 142 may include a processor-based computer (e.g., a personal computer, network computer, server, or mainframe computer) having one or more processors selectively activated or reconfigured by a computer program, as described below in reference to FIG. 2. In additional embodiments, client device 102, client device 104, data repository 130, and table management server 142 may be incorporated as corresponding nodes in a distributed network, and additionally or alternatively, as corresponding networked servers in a cloud-computing environment. Furthermore, client device 102, client device 104, data repository 130, and table management server 142 may communicate via network 120 with one or more additional servers (not shown), which facilitate the distribution of processes for parallel execution by the additional servers.

Figure 2:
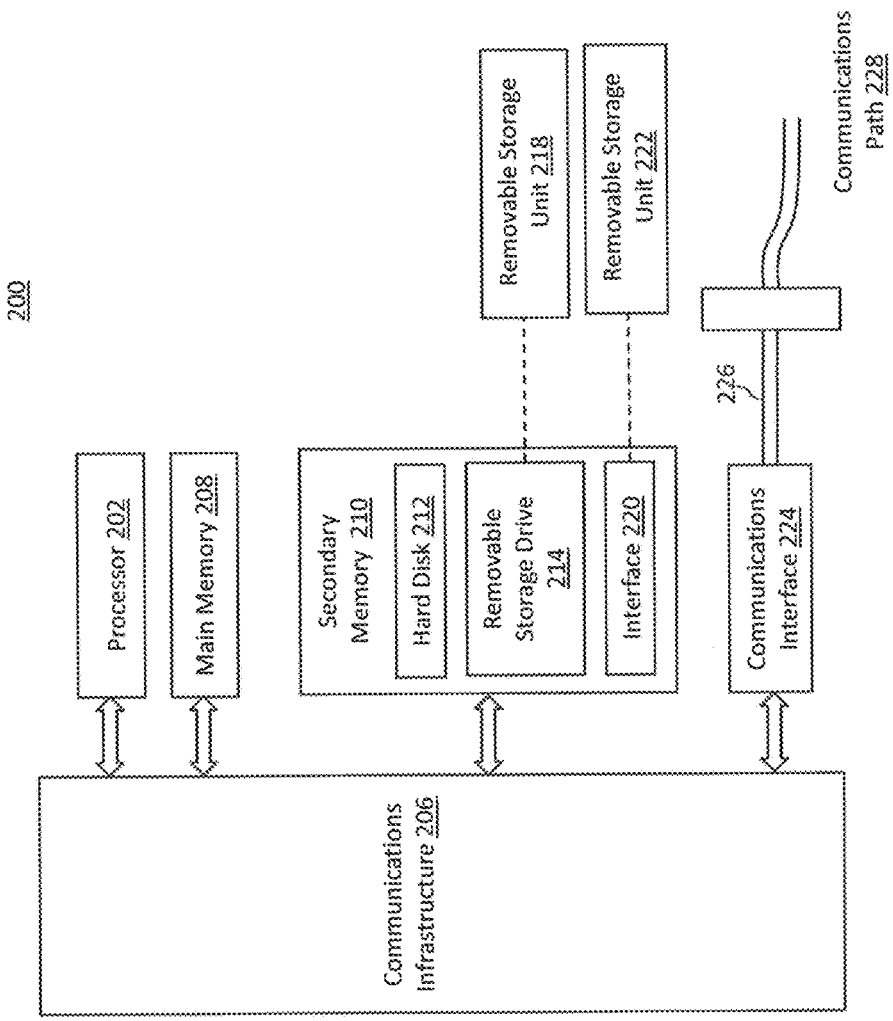
FIG. 2 is a diagram of an exemplary computer system, consistent with disclosed embodiments.

FIG. 2 illustrates an exemplary computer system 200 with which embodiments consistent with the present disclosure may be implemented. In certain embodiments, computer system 200 may reflect computer systems associated with user device 102, server 132, administrator system 140, content provider system 150, and/or social media system 160. In certain embodiments, computer system 200 may include one or more processors 202. Processor 202 may be connected to a communication infrastructure 206, such as a bus or communications network, e.g., a communications network 120 depicted in FIG. 1.

Computer system 200 may also include a main memory 208, for example, random access memory (RAM), and may include a secondary memory 210. Memory 208 may represent a tangible and non-transitory computer-readable medium having stored therein computer programs, sets of instructions, code, or data to be executed by processor 202. Secondary memory 210 may include, for example, a hard disk drive 212, and/or a removable storage drive 214, representing a magnetic tape drive, flash memory, an optical disk drive, CD/DVD drive, etc. The removable storage drive 214 may read from and/or write to a removable storage unit 218 in a well-known manner. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In some embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow, instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Communications interface 224 may transfer software and data in the form of signals 226, which may be electronic, electromagnetic, optical or other signals capable of being received by communications interface 224. These signals 226 may be provided to communications interface 224 via a communications path (i.e., channel 228). Channel 228 carries signals 226 and may be implemented using wire, cable, fiber optics, RF link, and/or other communications channels. In one embodiment, signals 226 comprise data packets sent to processor 202. Information representing processed packets can also be sent in the form of signals 226 from processor 202 through communications path 228.

In relation to the exemplary embodiment of FIG. 2, the terms "storage device" and "storage medium" refer to particular devices including, but not limited to, main memory 208, secondary memory 210, a hard disk installed in hard disk drive 212, and removable storage units 218 and 222. Further, the term "computer-readable medium" refers to devices including, but not limited to, a hard disk installed in hard disk drive 212, any combination of main memory 208 and secondary memory 210, and removable storage units 218 and 222, which may respectively provide computer programs and/or sets of instructions to processor 202 of computer system 200. Such computer programs and sets of instructions can be stored within one or more computer-readable media. Additionally or alternatively, computer programs and sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

As described above, the disclosed embodiments enable a client device at a commercial establishment (e.g., client device 102 or client device 104 at restaurant 110) to coordinate with table management system 140 and provide various table management services to the commercial establishment. For example, a party having a reservation may arrive at restaurant 110, or alternatively, a party without a reservation may walk into restaurant 110 and request a table. In such instances, a host at restaurant 110 may execute a table management application (e.g., local table management application 102A) on client device 102 to obtain information identifying an available table for the established reservation or walk-in party. Alternatively, if a table is not available, local table management application 102A may add the party to a corresponding waitlist and estimate a waitlist time until an appropriate table in restaurant 110 becomes available.

In one embodiment, client device 102 may determine an appropriate table or tables for the party based on locally stored data, e.g., local table management data 102B. For example, client device 102 may synchronize local table management data 102B with corresponding portions of data within data repository 130 to ensure that local table management data 102B includes current and up-to-date copies of restaurant data 132, table and seating configuration data 134, reservation/occupancy data 136, and customer data 138 that corresponding to restaurant 110. In such instances, client device 102 may render and display information identifying the appropriate table or tables to the user within a corresponding graphical user interface (GUI).

In certain aspects, client device 102 may initiate synchronization processes with data repository 130 on a daily basis, hourly basis, or in response to certain events (e.g., changes in server shift, receipt of requests for reservations or waitlist positions, etc,). Alternatively, data repository 102 may initiate the synchronization processes with client devices 102 and 104 by pushing updated data across network 120 at regular intervals, pre-determined times, or in response to specific events (e.g., in response to new reservation or waitlist request, modifications or reservations or waitlisted parties, etc.).

In other embodiments, client device 102 may coordinate with table management server 140 to identify one or more tables (e.g., unit of table inventory) capable of accommodating the party at the requested time. In certain aspects, client device 102 may obtain information identifying size of the party and a seating time associated with the requested table (e.g., immediate seating or seating at a specific time in the future). For example, a host or other employee of restaurant 110 may enter the party size and requested seating into a corresponding graphical user interface, or alternatively, client device 102 may obtain the party size and requested seating time from local table management data 102B (e.g., in the case of an existing reservation). Client device 102 may provide the party size and the requested seating time to table management system 140 through a call to a corresponding API.

In certain aspects, table management server 142 may execute table management application 144A) to identify one or more tables within restaurant 110 capable of accommodating the party size at the requested seating time. Table management server 142 may transmit information identifying the one or more tables to client device 102, which may process and render the received information for presentation to the host or other employee.

Figure 3:
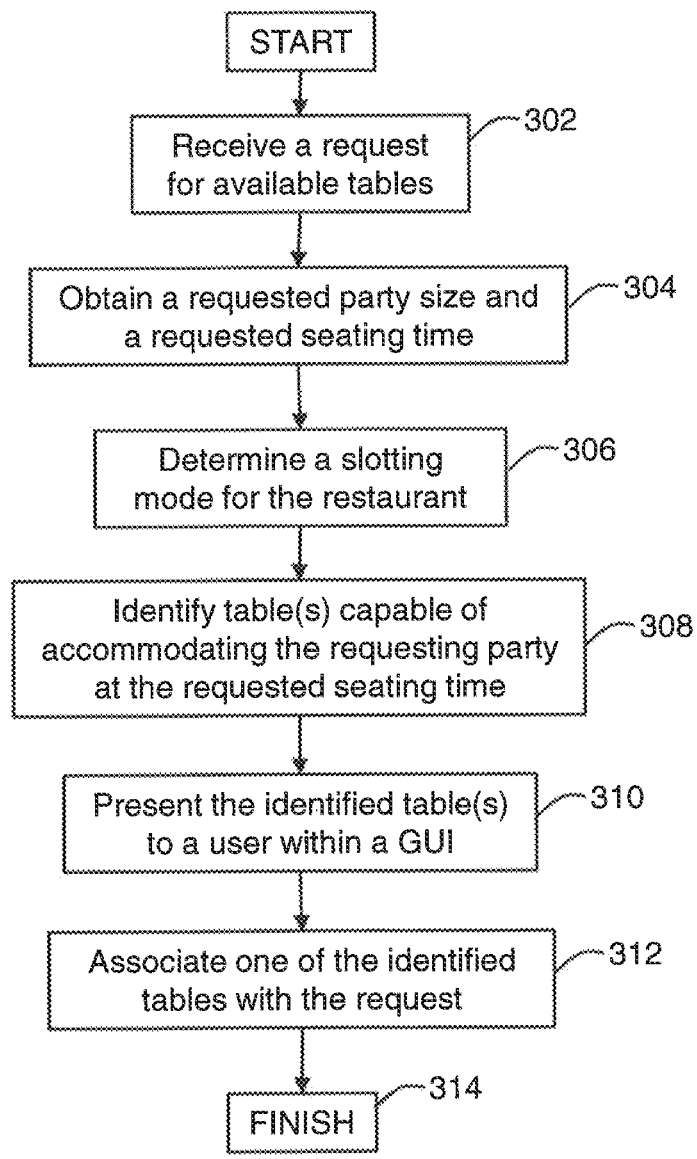
FIG. 3 is a flow chart of an exemplary method for identifying and managing available table inventory, according to embodiments of the present disclosure.

FIG. 3 is a flow chart of an exemplary method 300 for identifying available table and seating inventory in a commercial establishment, in accordance with embodiments of the present disclosure. Method 300 may provide functionality that enables a server associated with a table management system (e.g., table management server 142) to identify one or more tables within a restaurant (e.g., restaurant 110) capable of accommodating a requesting party at a requested seating time. In certain embodiments, table management server 142 may identify the one or more tables based on at least one of a slotting mechanism implemented by the restaurant, expected and actual table utilization at restaurant 110, rate limits for the restaurant at the requested seating time, server section usage and turnover time, point-of-sale (POS) information, and preferences and attributes of customers within the requesting party.

In step 302, table management server 142 may receive a request to identify tables available at restaurant 110 to accommodate a party at a corresponding seating time. For example, the party may be associated with an existing reservation at the restaurant. The party may check in with a host of the restaurant, and the host may access a graphical user interface (GUI) presented by a client device 102 to identify the reservation and transmit the request to table management server 142 through a call to a corresponding API.

As described above, however, the disclosed embodiments are not limited to parties having existing reservations. In additional embodiments, a party may walk into the restaurant and request a table, and the host may access the GUI and submit a query for one or more tables capable of immediately accommodating the party. Further, in other embodiments, the request received in step 302 may correspond to a request to establish a new reservation at restaurant 110 or a request to establish a position within a corresponding waitlist (or standby list) at restaurant 110. In such instances, the reservation and/or waitlist request may be submitted to table management system 140 through a web site associated with restaurant 110, a web site associated with management server 140, or through email or text message transmitted to table management system 140 from a mobile device of a customer.

In certain aspects, the received request may include, but is not limited to, a size of a requesting party and a requested seating time (e.g., immediately for a walk-in or at a corresponding reservation time for an established or potential reservation). In other aspects, the received request may include information identifying restaurant 110, and further, information identifying one or more customers associated with the requesting party. In step 304, table management server 142 may obtain at least the requested party size and the requested seating time from the received request, along with any additional or alternate information identifying the restaurant and/or the customers.

In step 306, table management server 142 may determine a mechanism by which restaurant 110 allocates table and set inventory (e.g., a "slotting mode"). For example, table management server 142 access table management data 144B, and additionally or alternatively, restaurant data 132 (through a call to a corresponding API), to obtain information identifying the slotting mode implemented by restaurant 110.

In one embodiment, restaurant 110 may implement a "manual" slotting mode that requires a host, manager, or other employee of restaurant 110 to manually assign incoming parties to available "slots," which represent pre-configured tables having minimum and maximum party sizes. Alternatively, restaurant 110 may implement an "automated" slotting mode that enables table management applications executing on one or more of client device 104 and table management server 142 to automatically assign an available slot to a received requested based on current and expected table and set inventory at restaurant 110.

For example, in a manual slotting mode, table management server 142 (and additionally or alternatively, client devices 102 and 104) may divide a business day of restaurant 110 into shifts (e.g., "Lunch" and "Dinner"), each of which may be sub-divided into increments of a predetermined duration (e.g., fifteen or thirty minutes). Table management server 142 may assign one or more slots to the increments, and store information identifying the assigned slots within reservation/occupancy data 136 of data repository 130, or alternatively, within local repositories available to table management server 142 (e.g., table management data 144B). In certain aspects, the slot information may include corresponding times and shifts, corresponding minimum and maximum party sizes, and a "web reservable" Boolean flag associated with the slots.

Alternatively, in an automated slotting mode, table management server 142 (and additionally or alternatively, client devices 102 and 104) may automatically assign tables to requests for availability based on current and expected table and seating inventories of restaurant 110. For example, in an automated slotting mode, each of the tables in restaurant 110, along with each potential combination of tables (e.g., "joint tables), may be assigned a minimum and maximum party size. When a reservation is established, the requesting party may be automatically assigned to a table or combination of tables available at the time of reservation. In certain aspects, the table (or combination of tables) may be removed from the table and seat inventory of restaurant 110 for a length of time that the party is expected to occupy that table. Further, in some instances, wait list parties are also factored into the availability calculations, as the disclosed embodiments may project a table and seating time for each party on the wait list and remove the table from the table and seat inventory for that period.

The specification of the automated or manual slotting mode by restaurant 110 may be driven by business considerations and may be temporally variable during the operation of restaurant 110 (e.g., a restaurant may implement manual slotting during slower periods and automated slotting during busier periods). For example, smaller restaurants and commercial establishments may decide to implement manual slotting, which requires a host or manager to assign programmatically determined available tables to a particular reservation or party. In such instances, the smaller table and seating inventory may not impose an undue burden on a host or manager. In other instances, larger and busier restaurants and commercial establishments may elect to implement automated slotting, especially during busier times, to streamline the allocation of table inventory to parties.

Further, in certain aspects, the slotting mode of restaurant 110 may vary depending on a particular day of the week, or alternatively, based on a particular time interval or shift (e.g., lunch or dinner). For example, restaurant 110 may implement manual slotting during weekday lunches, and may implement automated slotting during weekend lunches and dinners.

In step 308, table management server 142 may identify one or more tables capable of accommodating the party during the requested seating time. In an embodiment, table management server 142 may identify the available tables in step 308 based on locally available data (e.g., stored within table management data 144B) or data stored within data repository 130 (e.g., restaurant data 132, table and seating configuration data 134, reservation/occupancy data 136, and customer data 138) through a call to a corresponding API. In such instances, table management server 142 may transit information identifying the one or more available tables to client device 102.

In an embodiment, table management server 142 may identify the one or more available tables in step 308 based on the slotting mode of restaurant 110. For example, when restaurant 110 implements a manual slotting mode, table management server 142 may identify tables capable of accommodating the requested party size at the requested seating time when (i) the requested party size falls between a minimum and maximum party size for slots at the requested seating time and (ii) the Boolean flags for the slots at the requested seating time are set to "True," as described below in reference to FIG. 4. Alternatively, when restaurant 110 implements an automated slotting mode, table management server 142 may identify tables capable of accommodating the requested party size at the requested seating time in step 308 based on current and expected inventories of tables and seating within restaurant 110, as described below in reference to FIG. 5.

The disclosed embodiments are, however, not limited to processes that identify available table and set inventory based on restaurant slotting mechanisms and current or projected table and seat inventory within restaurant 110. In additional embodiments, table management server 142 may identify available tables in step 308 based on one or more customer attributes and preferences. For example, the request received in step 302 may correspond to a request for a reservation from a customer having a preferred or VIP status. In such instances, table management server 142 may further filter the available table and set inventory in step 308 to identify desirable or preferential inventory (e.g., tables with spacious seating or tables with interesting views). Further, in some embodiments, the customer associated with the reservation request may have one or more seating preferences (e.g., as expressed within corresponding profile data stored within customer data 138), and table management server 142 may further filter the available table and seating inventory to comport with the customers preferences.

In additional embodiments, table management server 142 may identify available tables step 308 based on historical point-of-sale (POS) data at restaurant 110. For example, historical POS data associated with restaurant 110 may indicate that parties of two customers consume larger quantities of food and alcoholic drinks when assigned to table capable of seating four customers than when assigned to a smaller table capable of seating two customers. In such instances, table management server 142 may further filter the available seating inventory to select one or more of the available tables that increase potential sales.

Furthermore, table management server 142 may identify available table and seating inventory in step 308 that optimizes server section use and/or server section turnover time. For example, table management server 142 may determine in step 308 to seat a two-person party at a four-person table if four-person tables are more available than two-person tables and/or if the particular four-person table is in a server section that is currently being underutilized. In such instances, seating in an underutilized section may decrease turnover time and improve service quality.

Referring back to FIG. 3, table management server 142 may generate instructions to transmit information identifying the one or more available tables to one or more of client devices 102 and 104 in step 310. For example, upon receipt of the transmitted information, client device 102 may render information associated with the identified table and seating inventory for presentation within a corresponding graphical user interface (GUI). In certain aspects, the host or other employee responsible for seating parties may select and assign one of the available slots of table and seat inventory to the requesting party (e.g., when the restaurant implements a manual slotting mode).

In additional embodiments, client device 102 may also provide the host with information identifying one or more parties associated with the request, such as customer images and other visual cues related to the party. For example, as described above, the host may generate a request for available tables at client device 102 when a party arrives for a scheduled reservation. In such instances, client device 102 may provide the host with an image of the customer and further, information identifying that the reservation celebrates a special occasion. In such instances, the additional information provided within the GUI may facilitate a rapid seating of arriving customers, reduce a time that the designated seat or table remains empty, and further, enhance the customer's experience at restaurant 110.

In step 312, table management server 142 may store information associating the received request with the assigned table in table management data 144B. Additionally or alternatively, table management server 142 may generate electronic instructions to transmit the information associating the received request and the assigned table to data repository 130 through a call to a corresponding API. In such instances, the transmitted information may synchronize the occupancy data stored locally at table management server 142 with reservation/occupancy data 136 stored within data repository 130. Data repository 130 may subsequently synchronize the stored data with client devices 102 and 104 (and additionally or alternatively, with table management system 140), as described above. Exemplary method 300 is then complete in step 314.

Figure 4:
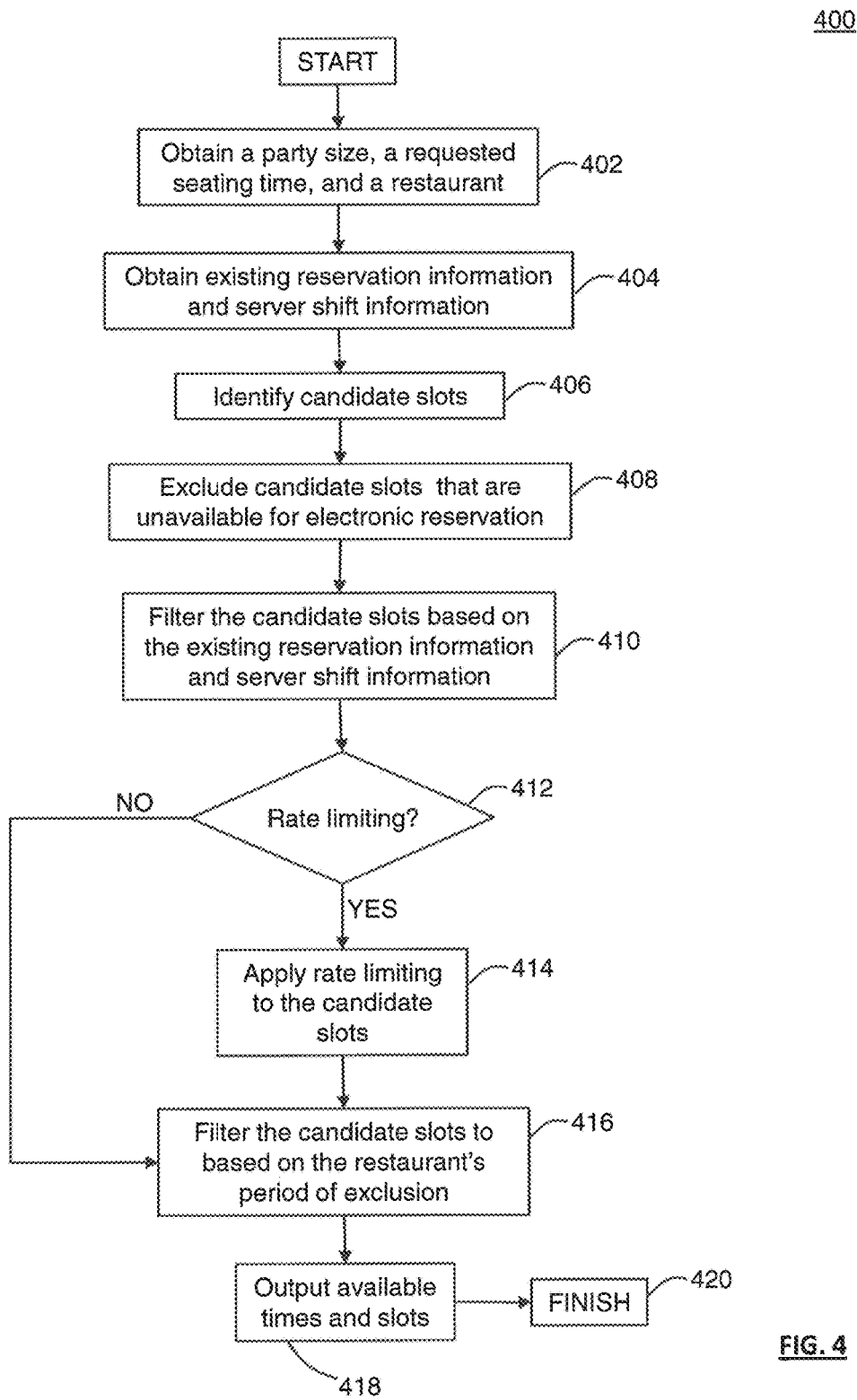
FIG. 4 is a flow chart of an exemplary method for identifying available table inventory in a restaurant implementing manual slotting, according to embodiments of the present disclosure.

FIG. 4 is a flow chart of an exemplary method 400 for identifying available tables in a restaurant implementing a manual slotting mode, in accordance with embodiments of the present disclosure. Method 400 may provide functionality that enables a table management server (e.g., table management server 142) to identify one or more candidate slots at a restaurant (e.g., restaurant 110) available to a requesting party at a requested seating time based on, among other things, existing reservations, shift information, web availability, rate-limiting parameters, and restaurant scheduling.

In step 402, table management server 142 may obtain a size of a party, a requested seating time, and information identifying a restaurant. As described above in reference to FIG. 3, table management server 142 may receive a request to identify tables available at restaurant 110 capable of accommodating the party at the corresponding seating time (e.g., in step 302 of FIG. 3). In step 402, table management server 142 may extract the party size, the requested seating time, and the restaurant information from the received request.

In step 404, table management server 142 may obtain information identifying existing reservations at restaurant 110, and further, information identifying one or more server shifts at restaurant 110. In certain aspects, the server shift information may identify particular days associated with corresponding server shifts (e.g., a shift may be scheduled for recurring Fridays), specific dates associated with corresponding server shifts (e.g., a shift may be scheduled for a May 26, 2014, which is a holiday), and/or a time and date interval associated with corresponding server shifts (e.g., a server may be assigned to a shift from 7:00 p.m. on May 11th to 2:00 a.m. on May 12$^{th}$).

In one embodiment, table management server 142 may obtain the existing reservation information and the server shift information from a locally accessible data source, e.g., table management data 144B. Alternatively, table management server 142 may obtain a portion of the existing reservation information and the server shift information from restaurant data 132 of data repository 130 through a call to a corresponding API.

In step 406, table management server 142 may obtain information identifying one or more candidate slots associated with the requested seating time. In one aspect, candidate slot information may identify slots assigned to the requested seating time, and as described above, may specify corresponding minimum and maximum party sizes and values of reservable Boolean flags. In other aspects, client device 104 identify candidate slots in step 406 that correspond to the requested seating time and additional times disposed before and after the requested seating time. For example, the requested seating time may be 11:30 a.m., and client device 104 may identify candidate slots corresponding to a range of times between 11:00 a.m. and 12:00 p.m.

In some embodiments, table management server 142 may access table management data 144B to obtain the candidate slot information. Additionally or alternatively, the locally stored data may be incomplete or outdated, and table management server 142 may obtain the candidate slot data in step 406 from reservation/occupancy data 136 of data repository 130 using a call to a corresponding API.

In step 408, table management server 142 may exclude one or more of the candidate slots unavailable for electronic reservation. For example, as described above, the candidate slot information includes, for the identified slots, minimum and maximum party sizes and Boolean flags indicative of an availability of the slots for electronic reservation. In certain aspects, in step 408, table management server 142 may identify one or more of the candidate slots having Boolean flags set to "False" (which indicates an lack of electronic reservability), and may exclude the identified slots from the candidate slots.

Table management server 142 may filter the candidate slots in step 410 based on the existing reservation information and the server schedule information. In certain aspects, table management server 142 may compare the candidate slot information against the existing reservation information, and exclude one or more slots assigned to an existing reservation from the candidate slots in step 410. Further, in step 410, table management server 142 may identify times and dates associated with the candidate slots, and exclude those slots having dates and times that fall outside of the dates and/or time intervals associated with the server shifts, as described above.

In step 412, table management server 142 may determine whether restaurant 110 is subject to rate limiting during the requested seating time. In certain aspects, rate limiting allows restaurant 110 to place a omit on the number of customers who reserve tables during a specified period (e.g., fifteen minutes). For example, restaurant 110 might be able to prepare a maximum of fifteen meals during a thirty-minute period, and as such, might limit a number of customer reservations to fifteen during any thirty-minute period. In some embodiments, restaurant 110 may impose a global restriction on reservations during any period of any day of the week, or alternatively, may tailor the rate limiting to specific days of the week and specific times of the day. For instance, restaurant 110 may impose a more stringent limit on reservations during peak dining times on weekends and holidays, and may relax or eliminate such limitations during slower or off-peak dining periods.

In an embodiment, table management server 142 may access table management data 144B to obtain information indicating whether restaurant 110 imposes rate limiting during the requested seating time. Alternatively, table management server 142 may obtain the rate limiting information for restaurant 110 from restaurant data 132 of data repository 130 using a call to a corresponding API.

In such aspects, the rate limiting information may identify whether restaurant 110 is subject to rate limiting during one or more days or time intervals (e.g., on specified holidays, on specified days and/or time intervals), or alternatively, is subject to a default, global rate limitation. Further, if the rate limiting information identifies multiple default rate limitations, table management server 142 may impose that rate limitation resulting in a maximum ratio of seated customers (e.g., "covers") per interval.

If table management server 142 determines that restaurant 110 is subject to rate limiting during the requested seating time, table management server 142 may apply the imposed rate limitation to the candidate slots in step 414. In one embodiment, table management server 142 may exclude one of more of the candidate slots that are unable to seat the requested party size (e.g., the requested party size exceeds the maximum value). Furthermore, table management server 142 may exclude those candidate slots that, although able to seat the requested party size, would cause a total number of seated customers (e.g., "covers") to exceed the maximum imposed by the rate limiting.

For example, at 11:30 a.m., the candidate slots include (i) a first slot assigned to an existing reservation for one person, and (ii) a second slot having no existing reservation, a minimum party size of two and a maximum party size of seven. Further, for example, table management server 142 may determine in step 412 that the restaurant imposes a rate limitation of five seated customers every fifteen minutes at 11:30 a.m. In such instances, table management server 142 would apply the rate limitation to exclude the first slot due to its association with an existing reservation, and determine that the second slot comports with the imposed rate limitation, since seating a party of four would result in five seated customers (i.e., the imposed rate limitation at 11:30 a.m.).

Referring back to FIG. 4, table management server 142 may process the candidate slots that comport with the imposed rate limiting to identify corresponding slot times, and may exclude in step 416 those candidate slots associated with slot times disposed within periods excluded by restaurant 110. For example, restaurant 110 may exclude reservations on certain holidays and other dates during which restaurant 110 may be closed. Further, for example, restaurant 110 may determine not to accept reservations during time intervals associated with specific shifts (e.g., due to server training, large parties, etc,). In such instances, in step 416, table management server 142 may eliminate one or more candidate slots associated with times that fall within these excluded periods.

In step 418, table management server 142 may output information identifying times associated with the candidate slots that comport with the imposed rate limiting, and further, that are not disposed within periods excluded by restaurant 110. In such instances, the identified times and candidate filtered slots may be passed back to step 308 of FIG. 3, as described above. Exemplary method 400 is then complete in step 420.

Referring back to step 412, if table management server 142 determines that the restaurant is not subject to rate limiting during the requested seating time or seating times, then method 400 passes directly to step 416. In step 416, table management server 142 may determine whether the candidate slots are associated with times that fall within period excluded by restaurant 110, as described above.

Figure 5:
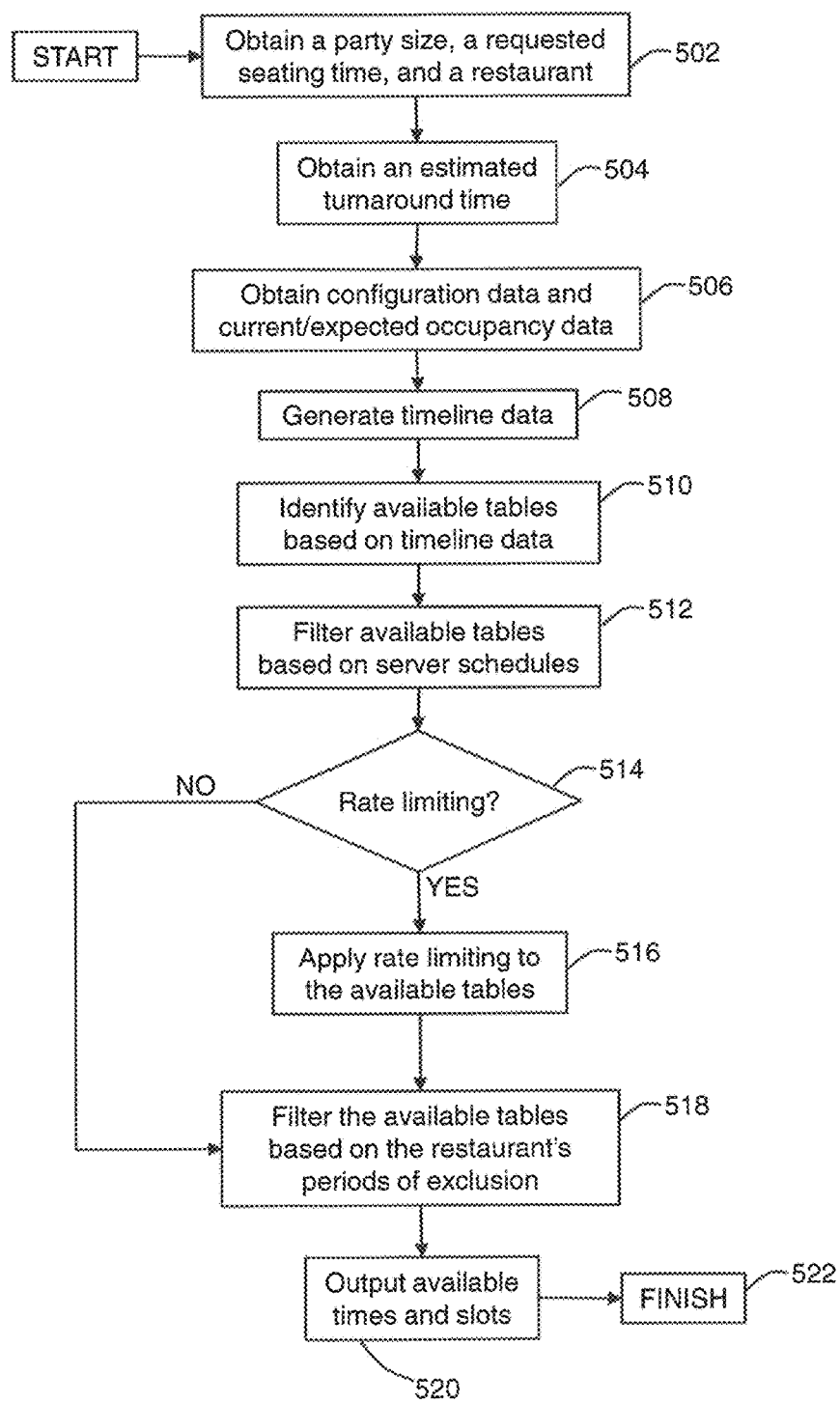
FIG. 5 is a flow chart of an exemplary method for identifying available table inventory in a restaurant implementing automated slotting, according to embodiments of the present disclosure.

FIG. 5 is a flow chart of an exemplary method 500 for identifying available tables in a restaurant implementing an automated slotting mode, in accordance with embodiments of the present disclosure. In some aspects, method 500 provides functionality that enables a table management server (e.g., table management server 142), to identify available tables within a restaurant (e.g., restaurant 110) based on currently on current and expected occupancy data within restaurant 110.

In step 502, table management server 142 may obtain a size of a requested party, a requested seating time, and information that identifies restaurant 110. As described above in reference to FIG. 3, table management server 142 may receive a request to identify tables available at restaurant 110 capable of accommodate the party at the corresponding seating time (e.g., in step 302 of FIG. 3). In certain aspects, table management server 142 may extract the party size, the requested seating time, and the restaurant information from the received request in step 502.

In step 504, table management server 142 may obtain information identifying an estimated turnaround time for the party size at the restaurant. In one embodiment, table management server 142 may access table management data 144 to obtain the information identifying the estimated turnaround time for the party. Alternatively, table management server 142 may obtain the estimated turnaround time for the requested party from restaurant data 132 of data repository 130 using a call to a corresponding API.

In certain aspects, the estimated turnaround time may represent an "average" turnaround time based on historical table occupancy data for restaurant 110. For example, table management server 142 may obtain the historical data and mean turnaround times for walk-in parties seated in restaurant 110. A standard deviation may be computed, and turnaround times for walk-in parties that fall within the range of [Mean−Standard Deviation; Mean+Standard Deviation] may be identified. Table management server 142 may determine the estimated turnaround time for all parties dining in restaurant 110 as an average of the identified walk-in turnaround times disposed within the range. If, however, the historical table occupancy data fails to include any walk-in parties, table management server 142 may establish a default estimated turnaround time of thirty-five minutes for restaurant 110.

The disclosed embodiments are, however, not limited to such average turnaround times, and in additional embodiments, the estimated turnaround time for the requested party may represent a concrete turnaround time associated with a previously seated party having a corresponding party size. In certain aspects, table management server 142 may order the historical table occupancy data for restaurant 110 as pairs of party size and corresponding turnaround time. If the historical table occupancy data includes a historical party size corresponding to the requested party size, then the historical turnaround time corresponds to the estimated turnaround time. If, however, the historical table occupancy data does not include requested party size, then table management server 142 may identify the largest historical party size that fails to exceed the requested party size, and may establish a corresponding historical turnaround time as the estimated turnaround time.

In other aspects, if the historical table occupancy data include neither the requested party size nor any historical party sizes smaller than the requested party size, table management server 142 may parse the historical table occupancy data to identify historical party sizes that exceed the size of the requested party. If no historical party sizes exceed the requested party size, then table management server 142 establishes a default turnaround time of sixty minutes as the estimated turnaround time for the requested party size. Alternatively, is historical party sizes exceed the requested party size, table management server 142 may establish, as the estimated turnaround time, the historical turnover time associated with a minimum of the historical party sizes that exceed the requested party size.

Referring back to FIG. 5, in step 506, client device 104 may obtain information identifying a configuration of table and seat inventory within restaurant 110, and further, information identifying a current and expected occupancy of tables in restaurant 110. In certain aspects, the current and expected occupancy information may identify at least one of (I) tables and seats of the restaurant currently occupied by customers, (ii) tables and seats associated with existing reservations, or (iii) tables and seats associated with walk-in parties. The current and expected occupancy information may also identify expected turnaround times for the currently occupied tables and seats, the existing reservations, and the walk-in parties. In certain aspects, the expected turnaround times may be determined based on one or more of the automated or manual techniques described above.

In one embodiment, table management server 142 may access table management data 144B to obtain the configuration information and current and expected occupancy information. Alternatively, table management server 142 may obtain the configuration information and current and expected occupancy information from seating configuration data 134 and/or reservation/occupancy data 136 of data repository 130 through a call to a corresponding API.

In step 508, table management server 142 may generate timeline information for each of the tables disposed within restaurant 110 based on the obtained configuration information and current and expected occupancy information. For example, in step 508, table management server 142 may process the obtained configuration information to identify one or more standalone tables and potential combinations of standalone tables (e.g., "joint" tables) disposed throughout the restaurant (or additionally or alternatively, disposed within specified seating areas of the restaurant). Client device 104 may generate empty timelines for the identified standalone tables and joint tables in step 508, and may add information identifying (i) currently seated parties and expected turnaround times, (ii) existing reservations and expected turnaround times, and (iii) walk-in parties and expected turnaround times to corresponding one of the timelines.

Figure 6A:
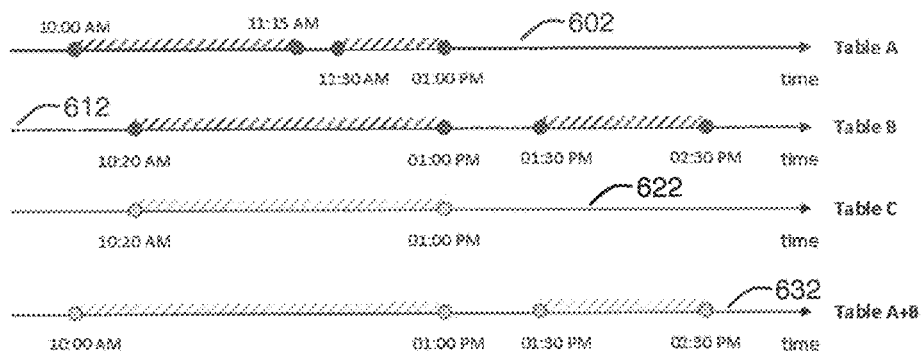
FIGS. 6A and 6B illustrate exemplary timeline data, according to embodiments of the present disclosure.

FIG. 6A illustrates an exemplary set of timelines 600, in accordance with the disclosed embodiments. In certain embodiments, table management server 142 may determine, based on the configuration information, that the restaurant includes three standalone tables (e.g., Tables A, B, and C) and one joint table (e.g., Table A+B). As described above in reference to step 508, table management server 142 may construct separate timelines for each of Tables A, B, C, and A+B, and may populate the timelines with currently seated parties, expected reservations, and walk-in parties. For example, as illustrated in FIG. 6A, timeline 602 indicates that Table A is occupied between 10:00 a.m. and 11:15 a.m., and between 12:30 p.m. and 1:00 p.m. Similarly, timeline 612 indicates that Table B is occupied between 10:20 a.m. and 1:00 p.m. and between 1:30 p.m. and 2:30 p.m., and timeline 622 indicates that Table C is occupied between 10:20 a.m. and 1:00 p.m. Furthermore, timelines 632 indicated that potential joint Table A+B is occupied between 10:00 a.m. and 1:00 p.m., and between 1:30 p.m. and 2:30 p.m.

Referring back to FIG. 5, in step 510, table management server 142 determines initial time intervals during which one or more of the standalone and joint tables are available for occupancy. For example, in step 510, table management server 142 may "invert" the generated timelines to generate information indicative of time intervals during which the standalone tables and joint tables are available for occupancy. In certain aspects, table management server 142 may collapse the inverted timelines to generate a unified timeline of available tables. Table management server 142 may, in such instances, identify the available time intervals for the standalone and joint tables in accordance with the requested party size, an estimated turnaround time, and information identifying minimum party sized, maximum party sizes, and a reservability of the tables (e.g., the value of the Boolean flag).

Figure 6B:
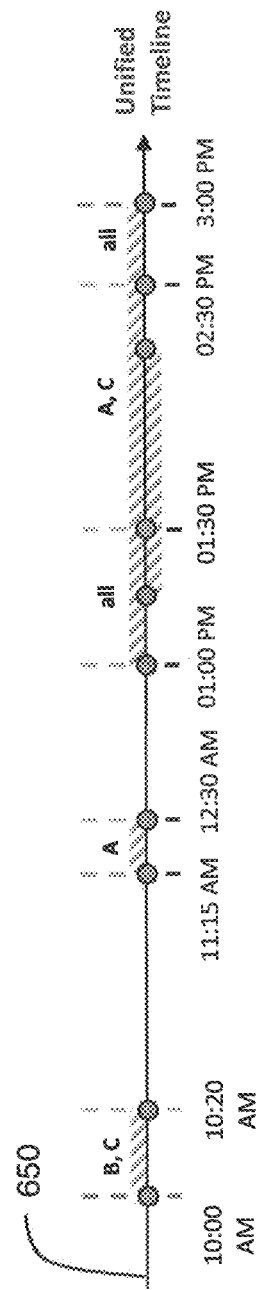

FIG. 6B illustrates an exemplary unified timeline 650, which may be generated by table management server 142 in accordance with the disclosed embodiments. In FIG. 6B, unified timeline 650 indicates that: Tables B and C are available between 10:00 a.m. and 10:20 a.m.; Table A is available between 11:15 a.m. and 12:30 p.m.; Tables A, B, C, and A+B are available between 1:00 p.m. and 1:30 p.m. and between 2:30 p.m. and 3:00 p.m.; and Tables A and C are available between 1:30 p.m. and 3:30 p.m.

Further, in one example, client device 104 may analyze unified timeline 650 to identify tables capable of accommodating a party of four for sixty minutes at a requested seating time of 1:15 p.m. As outlined in FIG. 6B, Table B has a maximum party size of two, and as such, is too small to accommodate the requested party. Further, although Table C may accommodate a party of five, Table C is not available for electronic reservation. Joint Table A+B is available from 1:00 p.m. to 1:30 p.m., but is unable to accommodate the estimated sixty minute turnaround time. In this example, client device 104 may determine that Table A can accommodate the party of four at 1:15 p.m. for an expected turnaround time of sixty minutes, and may output a 1:15 p.m. slot associated with Table A from step 510.

Returning back to FIG. 5, in step 512, table management server 142 may filter the available slots based on server schedule information. In certain aspects, as described above, table management server 142 obtain server schedule information associated with restaurant 110, exclude those available slots having dates and times that fall outside of the dates and/or time intervals associated with the server shifts, as described above in reference to FIG. 4.

In step 514, table management server 142 may determine whether the restaurant is subject to rate limiting during the requested seating time. As described above, table management server 142 may access local table management data 144B to obtain information indicating whether restaurant 110 imposes rate limiting during the requested seating time. Alternatively, table management server 142 may obtain the rate limiting information for restaurant 110 from restaurant data 132 of data repository 130 through a call to a corresponding API.

In such aspects, the rate limiting information may identify whether restaurant 110 is subject to rate limiting during one or more days or time intervals (e.g., on specified holidays, on specified days and/or time intervals), or alternatively, is subject to a global rate limitation. Further, if the rate limiting information identifies multiple default rate limitations, table management server 142 may impose that rate limitation resulting in a maximum number of seated customers (e.g., "covers") per interval.

If table management server 142 determines that restaurant 110 is subject to rate limiting during the requested seating time, table management server 142 may apply the imposed rate limitation to the available tables in step 516, as described above. In step 518, as described above, table management server 142 may exclude one or more of the available tables that comport with the imposed rate limits when these available tables fall within periods excluded by restaurant 110.

In step 520, table management server 142 may output information identifying times associated with tables that comport with the imposed rate limiting, and further, that are not disposed within periods excluded by restaurant 110. In such instances, the identified times and tables may be passed back to step 308 of FIG. 3, as described above. Exemplary method 500 is then complete in step 522.

Referring back to step 514, table management server 142 may determines that the restaurant is not subject to rate limiting during the requested seating time or seating times. In such instances, method 400 passes directly to step 518, as described above.

In the embodiments disclosed above, table management server 142 may identify available slots capable of accommodating a requesting party at a corresponding seating time. The disclosed embodiments are, however, not limited to processes that return slots available at restaurant 110 for a single, specific time. In further embodiments, the exemplary processes described above in reference to FIGS. 3-5 may identify available slots at a single restaurant (e.g., restaurant 110) over one or more time intervals disposed across multiple calendar days, or alternatively, ranges of consecutive and/or non-consecutive calendar days. Further, in certain embodiments, the exemplary processes of FIGS. 3-5 may return not only slots available at restaurant 110, but also slots available at a multiple restaurants on the specified time and day, specified time intervals, or specified ranges of consecutive or non-consecutive days. For example, the multiple restaurants may correspond to restaurants of a single genre specified by a user that accesses table management system 140 through a corresponding web site rendered on a user device, or alternatively, may represent a query from the user for a list of all restaurants having availability for a specified party on specified days and time.

Further, in the embodiments described above, table management server 142 executes table management application 144A to perform the exemplary processes of FIGS. 3-5. The disclosed embodiments are, however, not limited to such exemplary implementations. For example, client device 102, and additionally or alternatively, client device 104 may execute local table management applications (e.g., local table management applications 102A and 104A) to perform the exemplary methods described above in reference to FIGS. 3-5. In such instances, client device 102, and additionally or alternatively, client device 104, may leverage locally available data repositories (e.g., local table management data 102B and 104C), and further, remotely disposed data repositories (e.g., data repository 130) through calls to one or more APIs.

As described above, client device 102 may present information identifying available tables, as well as other table management information, to a host or other employee of restaurant 110 through a corresponding graphical user interface (GUI).

FIGS. 7A-7D illustrate exemplary configurations of a GUI 700 through which a host or other employee of restaurant 110 may allocate and manage table and seat inventory in restaurant 100. In certain aspects, client device 102 may present GUI 700 to the host through a corresponding display screen or display unit. The disclosed embodiments are, however, not limited to such exemplary devices, and in further embodiments, GUI 700 presented by client device 102 and any additional or alternate device in communication with table management system 140 and capable of executing a local table management application, as described above.

Figure 7A:
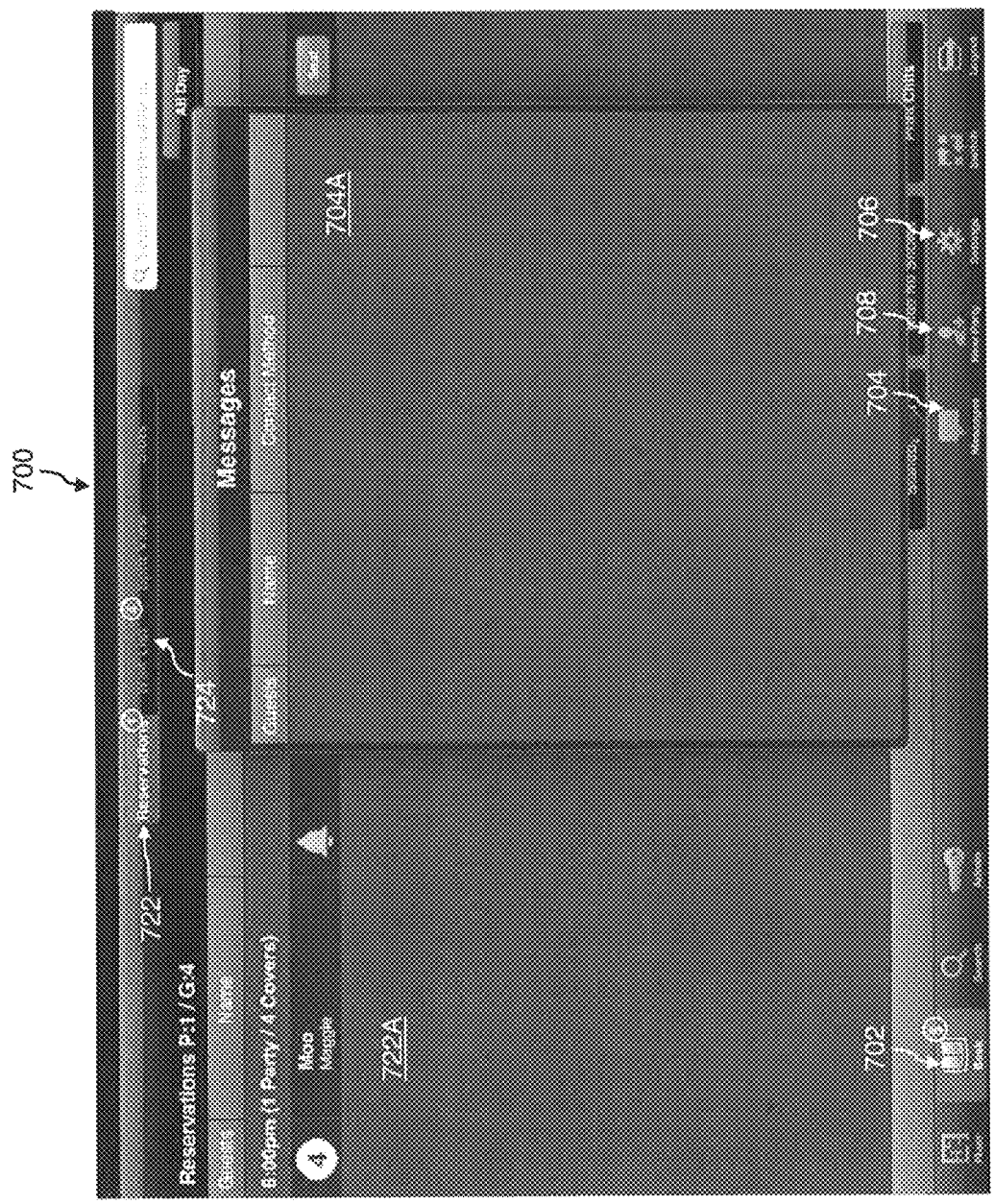

For example, in FIG. 7A, the host may click, tap, or otherwise activate "Book" icon 702 to obtain information identifying a status of reservations, waitlisted parties, and available slots at restaurant 110 on a particular day. Further, "Reservations" icon 722 indicates an existence of a single reservation at restaurant 110, and "Wait List" icon 724 indicates that four parties are currently on the waitlist for restaurant 110. By clicking on "Reservations" icon 722, the host may obtain detailed information describing the existing reservation for restaurant 110 within corresponding reservations pane 722A. For example, reservation pane 722A indicates that "Maggie Moo" established a reservation for a party of four at 6:00 p.m., and that the exemplary processes described above assigned "Table 12" to the reservation. Further, in FIG. 7A, the host may click on "Messages" icon 704 to obtain information identifying current communications between guests and restaurant 110 in message pane 704A.

Figure 7B:
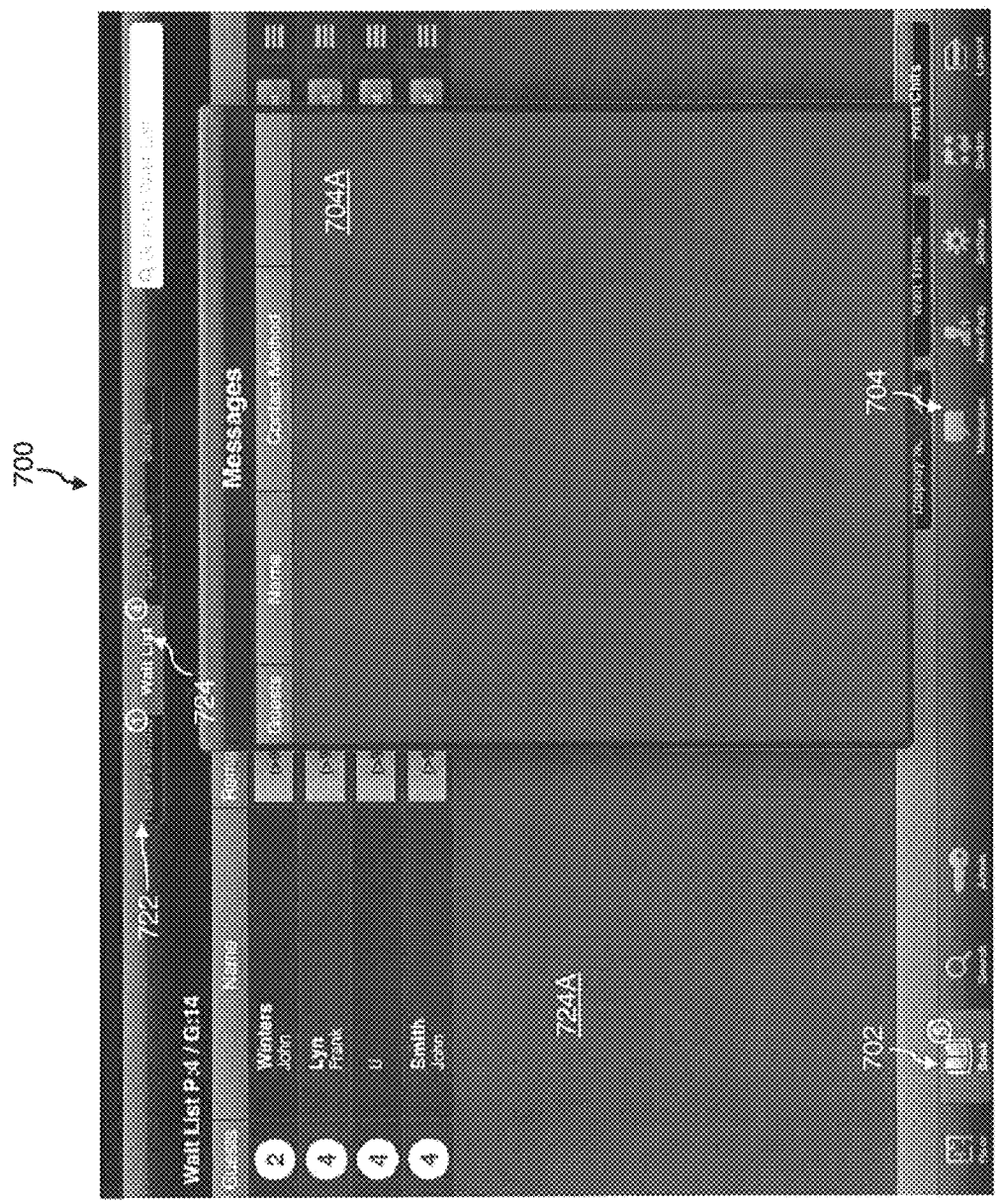
Figure 7C:
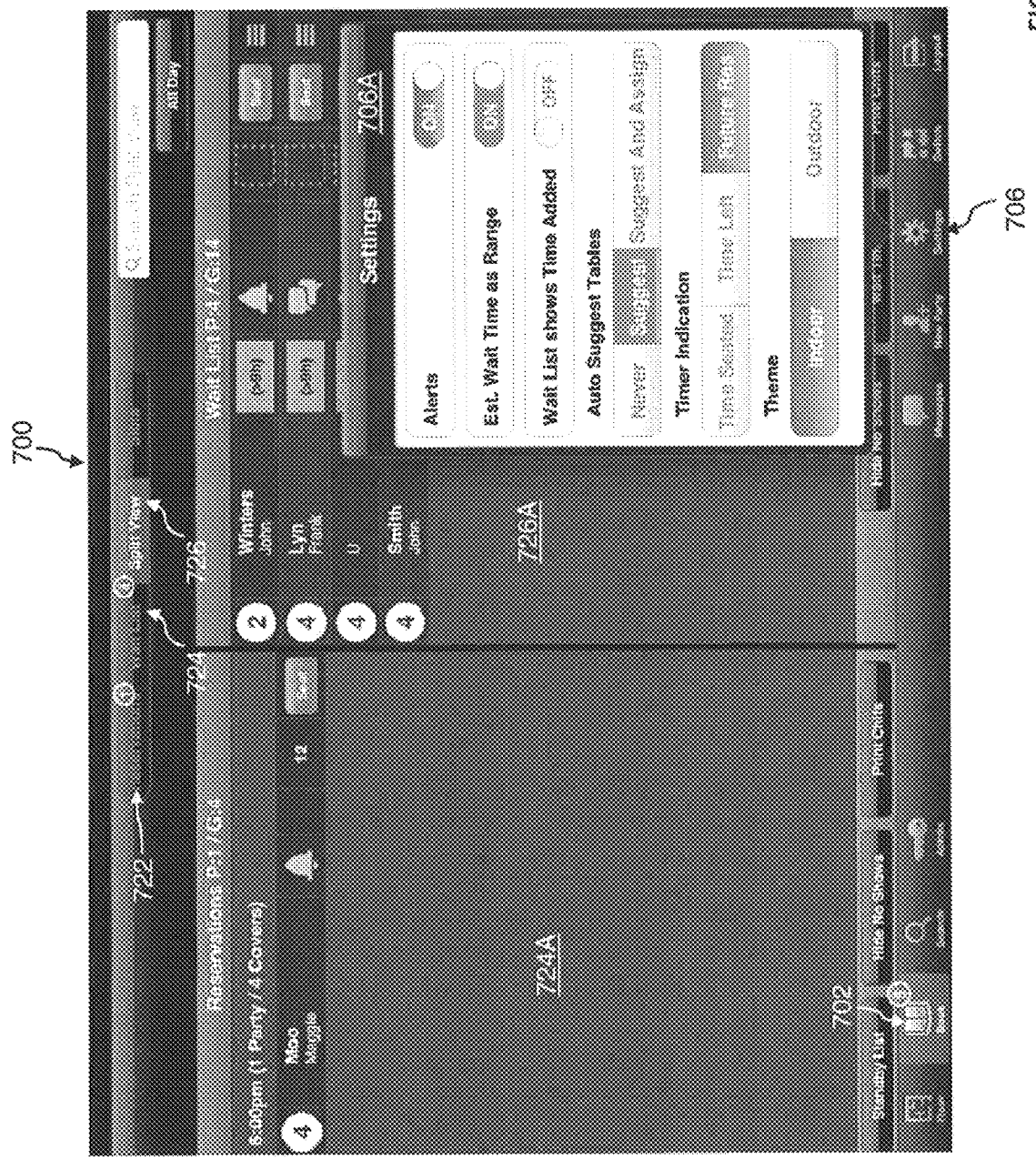

Further, as illustrated in FIG. 7B, the host or other employee may click on "Wait List" icon 724 to view detailed information identifying the four parties currently on the waitlist for restaurant 110 within waitlist pane 724A. As illustrated in FIG. 7C, the host or other employee may click on "Split View" icon 726 to view simultaneously information from reservations pane 724A and waitlist pane 726A. Further, in FIG. 7C, the host may modify one or more settings of GUI 700 by clicking on "Settings" icon 706, which generates and displays settings window 706A. For example, settings window 706A may enable the host or other employee activate or disable alerts, range-based estimated waiting times, and/or a display of times at which parties are added to the waitlist. Further, settings window 706A may enable the host to elect whether to establish preferences for auto-suggestion of tables, timers, and themes.

Figure 7D:
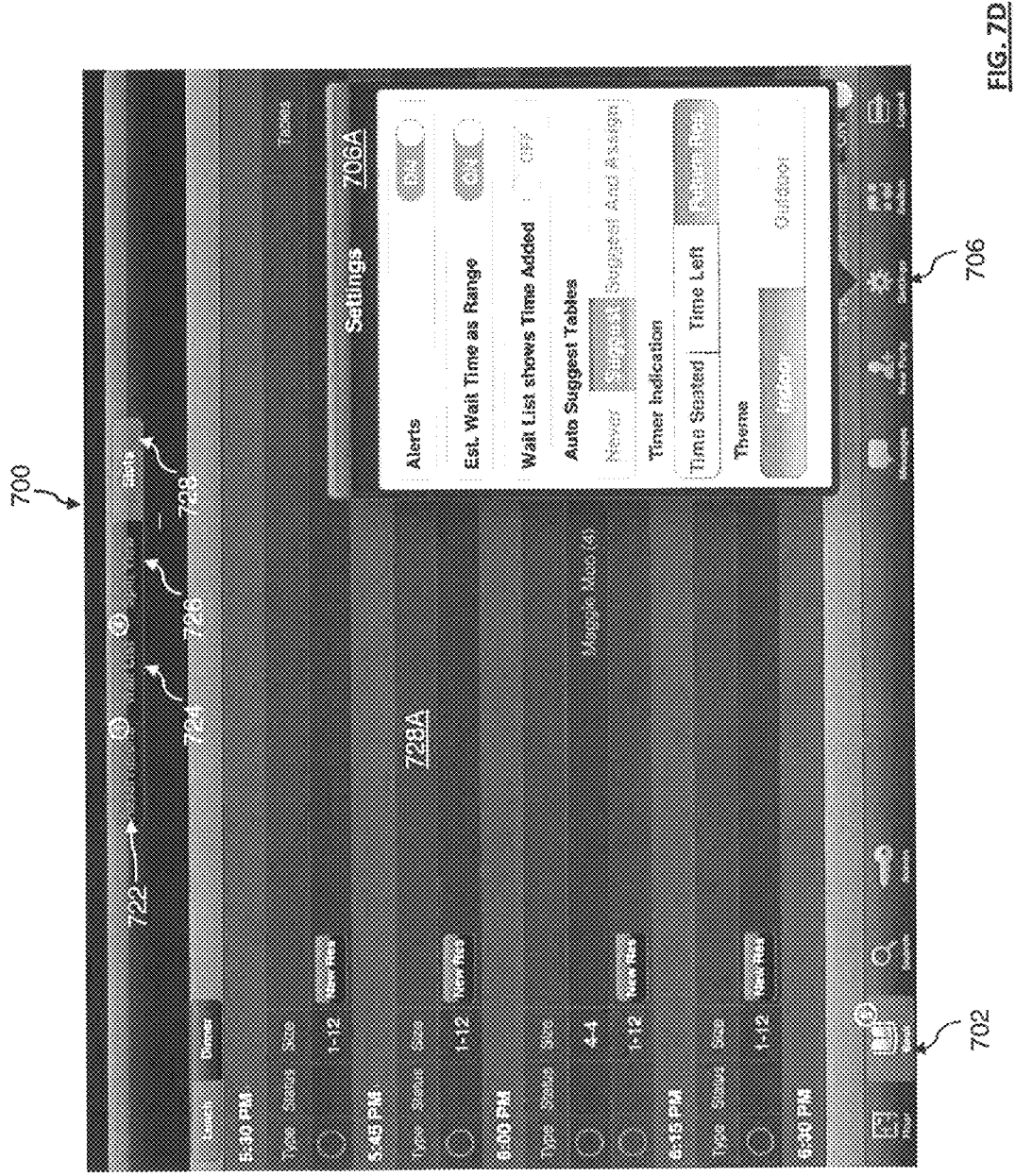

In FIG. 7D, the host may click or otherwise activate a "Slots" icon 728 to display a slots pane 728A that identifies one or more available and reserved slots at restaurant 110. For example, as illustrated in FIG. 7D, restaurant 110 has available slots at 5:30 p.m., 5:45 p.m., 6:00 p.m., and 6:15 p.m. (e.g., with a minimum party size of unity and a maximum party size of twelve). Further, although FIGS. 7C and 7D depict settings window 706A with respect to "Split View" icon 726 and "Slots" icon 728, the host may click on "Settings" icon 706 to modify the GUI settings associated with any other display format or mode presentable by GUI 700.

In the embodiments described above, table management server 142, may determine available table and seat inventory in response to a request to establish a reservation at restaurant 110, or alternatively, at a time subsequent to the establishment of the reservation. For example, and as described above, a customer may reserve a table at restaurant 110 by calling restaurant 110, or by approaching a host or other employee of restaurant 110.

In additional embodiments, the customer may access a web page associated with restaurant 110, which may incorporate a plug-in or other widget that enables the customer to communicate with table management system 140 and request a reservation at restaurant 110. For example, the customer may provide information relevant to the requested reservation, such as a requested seating time and date, a party size, the customer's name and contact information, and other information and requests (e.g., special occasions, food allergies etc.), which may be provided to table management server 142 through the plug-in or widget. Table management server 142 may, in such instances, execute table management application 144A to establish the reservation on the requested date, identify table and seating inventory capable of accommodating the requested party size at the requested time and date, and further, store information associated with the established reservation within reservation/occupancy data 136 of data repository 130. In certain aspects, table management server 142 may receive and process modifications and cancellations to the established reservation, and subsequently update reservation/occupancy data 136 to account for the modified or cancelled reservation.

Furthermore, table management server 142 may log all communications received from and transmitted to the customer during the course of establishing, modifying, and/or cancelling a reservation, and store the entire communications thread within table management data 144B, and additionally or alternatively, data repository 130. For example, such communications may include, but are not limited to emails, text messages, and other electronic communications that: request a reservation, confirm an established reservation, update customers regarding established reservation (e.g., alerts of upcoming reservations), request modifications or cancellations to establishes reservations, request customer-specific information (e.g., dietary requirements, seating preferences, etc,), request that customers provide post-dining feedback, provide post-dining feedback from customers, and/or provide promotional materials to customers. For example, such post-dining feedback may include, but is not limited to, a complete "MadLib" template or specific comments on menu items, which may be available to other customers for review.

In further embodiments, table management server 142 may provide alerts or other notifications to client devices 102 and 104 when a new reservation is established, and further, when a customer requests modification or cancellation of an established reservation. In such instances, the provided alerts may include information associated with the reservation, as added, modified, or cancelled, which may be stored within local data repositories accessible to client devices 102 and 104 (e.g., local table management data 104B). Further, the provided alerts may be displayed within a portion of a graphical user interface (GUI) presented to a host or other employee by client device 102 and/or client device 104 (e.g., GUI 700 of FIGS. 7A-7D).

Figure 7E:
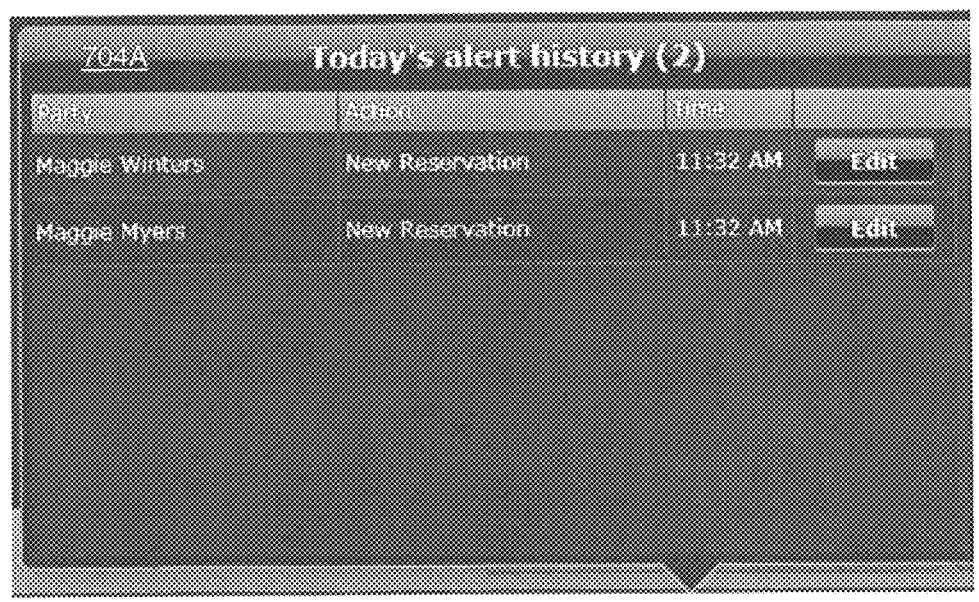

In certain aspects, the provided alerts may be displayed within a messages pane 704A of GUI 700, as illustrated in FIG. 7E. For example, in FIG. 7E, table management server 142 provided alerts that "Maggie Winters" and "Maggie Myers" established new reservations at restaurant 110 at 11:32 a.m. Further, although not depicted in FIG. 7E, information associated with the new reservations and the table and seating inventory assigned to these new reservations by table management server 142 may be displayed to the host or other employee within a corresponding reservations pane of GUI 700 (e.g., reservations pane 722A of FIG. 7A).

Figure 7F:
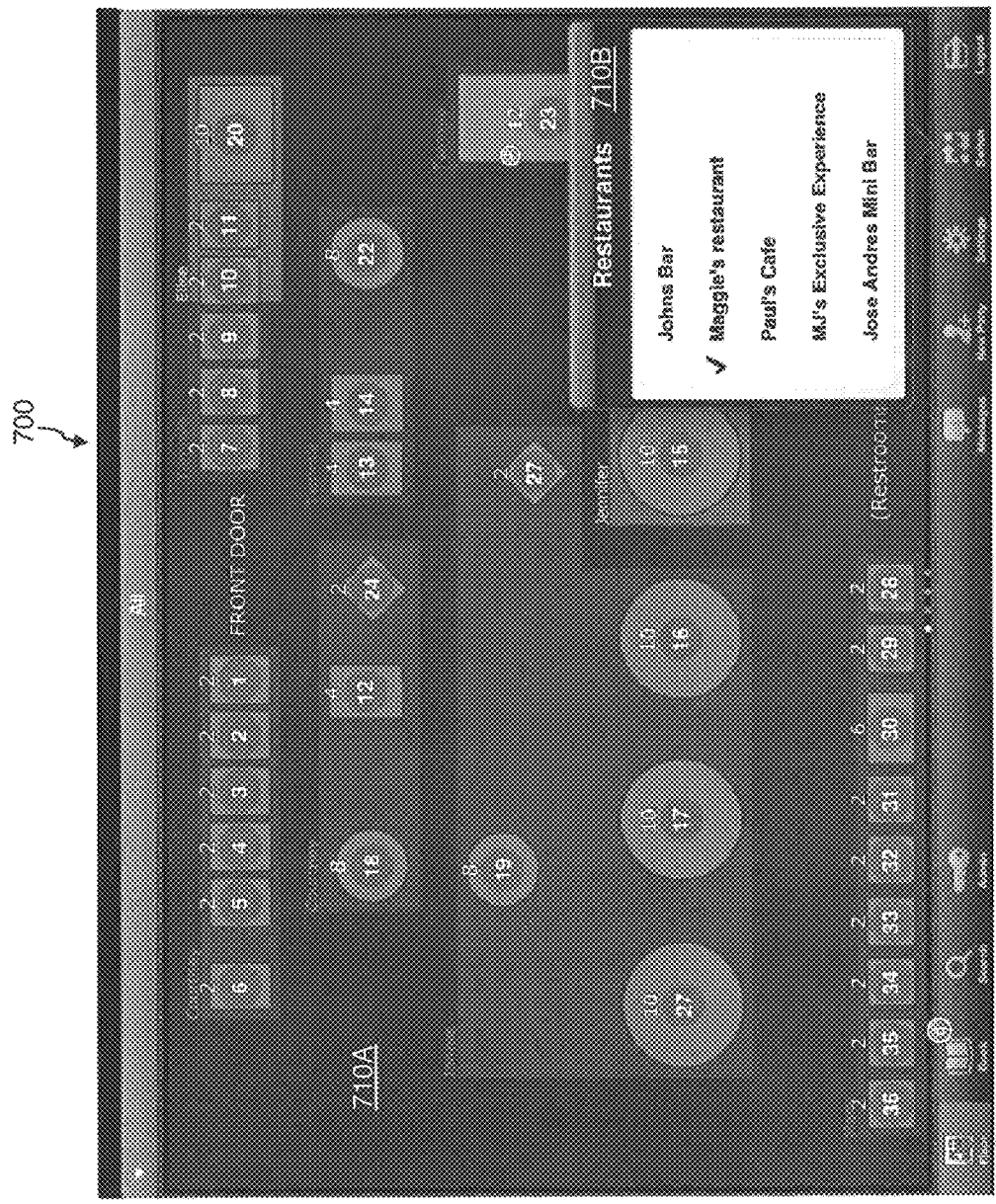

In some embodiments, the host of restaurant 110 may view a floor plan of one or more seating areas of restaurant 110 using GUI 700. For example, as illustrated in FIG. 7F, the host may click or otherwise select "Floor" icon 710 of GUI 700 to view a current floor plan 710A of restaurant 110, which specifies a current configuration of seat and table inventory.

Further, in additional embodiments, GUI 700 may provide functionality that enables a manager or other employee of restaurant 110 to multiple establishments. In such instances, the selected restaurant may be related to restaurant 110 through common or aligned management or ownership. For example, in FIG. 7F, the manager or employee having sufficient permission may select one or more additional restaurants within interface 710E to access information about the selected restaurant.

For example, the manager may select "John's Bar," and GUI 700 may provide the manager with waitlist and availability information for "John's Bar." In certain aspects, GUI 700 may present a dashboard interface illustrating time and party size on axes of a grid to provide an easy-to-understand overview of usage of the restaurant's use, capacity, and/or availability. In such instances, the manager may determine that "John's Bar" has significant availability between 7:00 PM and 9:00 PM, and may instruct the host to direct customers to "John's" Bar if they are unable to unwilling to wait for an available table at restaurant 110. FIG. 7G illustrates an exemplary dashboard associated with several related restaurants, consistent with the disclosed embodiments.

In further embodiments, table management system 140 may establish a standby list for restaurant 110. The standby list may, in certain aspects, enable customers of restaurant 110 to request available tables on times and dates without current availability. In such instances, table management system 140 may provide notifications to client devices 102 and 104 that a party has been added to the standby list, which may be presented to users of client device 102 and 104 through a corresponding graphical user interface (e.g., GUI 700 of FIGS. 7A-7F). Further, if table management system 140 determines that table and seating inventory becomes available in restaurant 110, table management system 140 may provide an electronic notification (e.g., an email or text message) to an appropriately sized party selected from the standby list.

For example, table management system 140 may determine that a customer cancels an existing reservation, and may transmit a notification to client devices 102 and/or 104, which may forward the notification to the appropriate party. Further, if table management system 140 detects such a cancellation outside of normal business hours, table management system 140 may transmit an email to a host, manager, or other employee of restaurant 110 providing a corresponding notification. In such instances, the host, manager, or other employee may determine whether to convert a standby party (or another waiting party) into an actual reservation, and may subsequently notify the waiting or standby party of the now-existing reservation.

In additional embodiments, table management system 140 may, in conjunction with client devices 102 and 104, establish and subsequently manage a waitlist for table and seating inventory within restaurant 110. For example, a customer may approach a host or other employee of restaurant 110 and inquire about a wait time for a party having a particular size. In such instances, the host or other employee may access a graphical user interface (GUI) provided by local table management application 104B of client device 104 (e.g., GUI 700 of FIG. 7A), and click on a corresponding icon (e.g., "New Party" icon 706 of FIG. 7A) to enter information identifying the customer and to determine an estimated wait time for the party. Alternatively, table management system 140 assign a party having a particular size to the waitlist when an initial availability query identifies no available tables.

Figure 8:
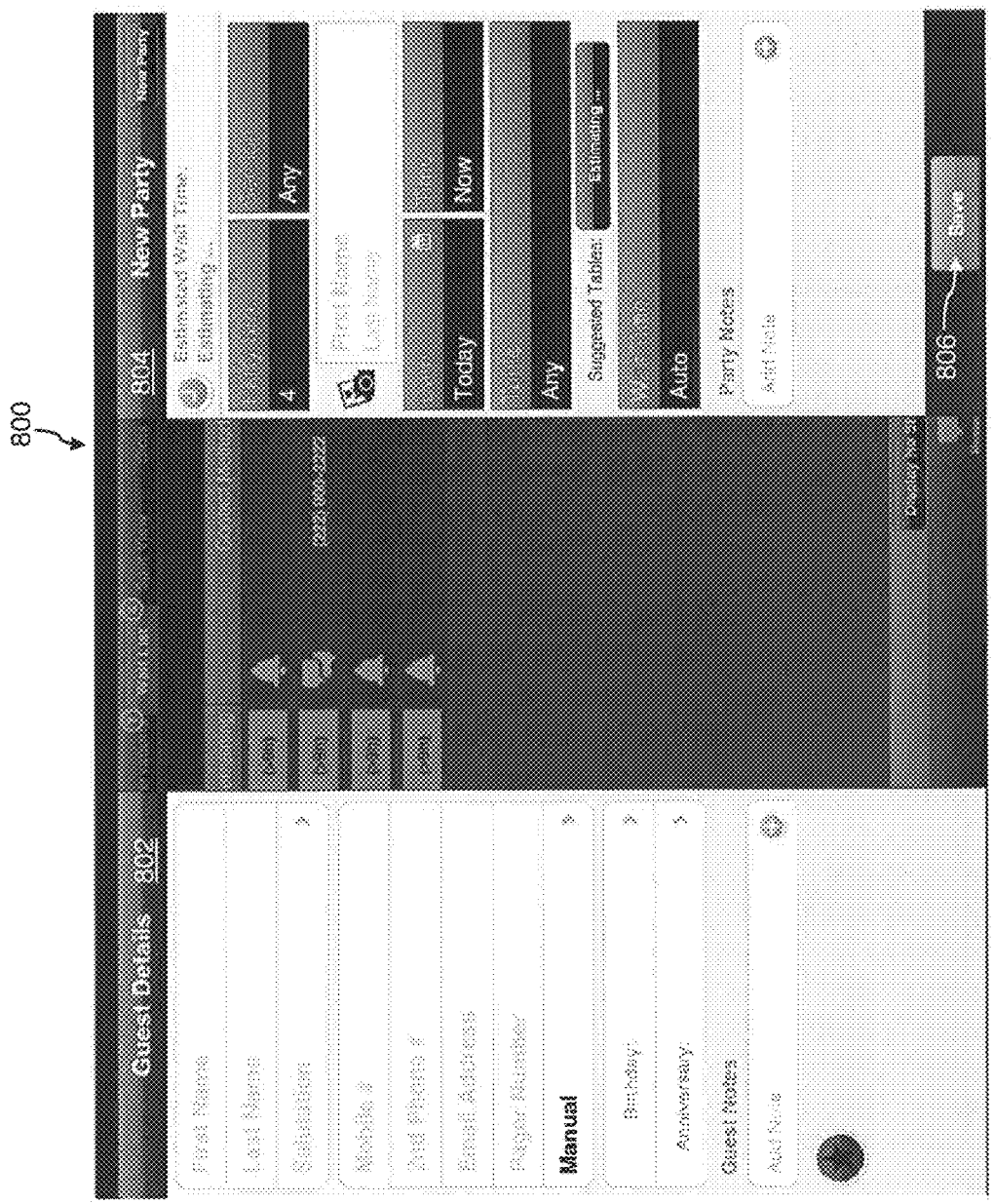

For example, as illustrated in FIG. 8, the host or other employee may obtain and enter contact information for the customer in a "Guest Details" pane 802 of GUI 800, and further, may specify details regarding the party to obtain an estimated wait time for the party within "New Party" pane 804 of GUI 800. For example, the host may enter a party size, any desired server or restaurant section, a requested date, a requested time, and any desired table into "New Party" pane 804 to obtain the estimated wait time. Further, by clicking on "Save" icon 806, the host may establish the new party's position within the waitlist associated with restaurant 110, which may be displayed within waitlist pane 724A of FIG. 7B.

In certain aspects, table management server 142 may compute the estimated wait time for the party size and requested seating time based on a time-of-day associated with the request, expected turn time statistics, holds, rate limits, table status, point-of-sale information, and external data such as weather and local event data. For example, the weather and local event data may be obtained by table management server 142 from online weather bureaus, governmental entities, and other appropriate data providers through calls to corresponding APIs. In one embodiment, table management server 142 may perform one or more of the exemplary processes outlined above in reference to FIGS. 3-5 to identify tables in restaurant 110 available to accommodate the new party at the requested seating time, and may determine the estimated waiting time based on a time at which the one or more tables become available.

In additional embodiments, table management system 140 may enable a customer to request a position on a waitlist for restaurant 110 when the customer is disposed in a vicinity of restaurant 110. By way of example, the customer may transmit an email or a text message from a mobile device to table management system 140 (and additionally or alternatively, to restaurant 110), which may determine a position of the customer's mobile device based on the received email or text message. If the location of the customer's mobile device falls within a predetermined threshold distance of restaurant 110, or alternatively, falls within one or more predetermined geographic locations (e.g., a shopping mall that houses restaurant 110), table management system 140 may add the customer to a waitlist to restaurant 110 and provide a corresponding notification to restaurant 110, as described above.

Further, in certain aspects, table management system 140 (and additionally or alternatively, client devices 102 and 104) may be interact with a customer's mobile communications device (e.g., mobile phone, tablet computer, or smartphone) to exchange information regarding reservations, waitlists, and other promotional information. For example, the received and transmitted communications may include, but are not limited to, emails, text messages, and other electronic communications that: request reservations, confirm established communications, provide updates to customers regarding reservations (e.g., alerts of upcoming reservations), request modifications or cancellations to reservations, request customer-specific information (e.g., dietary requirements, seating preferences, etc,), request customers provide post-dining feedback, provide post-dining feedback from customers, and/or provide promotional materials to customers. For example, such post-dining feedback may include, but is not limited to, a complete "MadLib" template or specific comments on menu items, which may be available to other customers for review.

In certain aspects, table management system 140 may transmit an electronic communication (e.g., an email or a text message) to a party on a waitlist for restaurant 110 when a table becomes available for immediate seating. In such instances, table management system 140 may "page" the mobile communications device associated with the party to alert the party to the available table.

In additional embodiments, table management system 140 may provide the customer with alerts, promotional materials, and additional offers based on a status of the customer with table management system 140, and further, based on a customer's prior reservation history at restaurants associated with table management system 140. By way of example, table management server 142 may associate the customer with an enhanced status (e.g., a VIP status based on a number of established reservations), and may provide the customer with exclusive offers based on the enhanced status. For instance, table management system 140 may provide the customer with an opportunity to reserve a table at a new, trendy restaurant before other customers may access table and seating inventory.

Further, in some instances, the enhanced-status customer may receive early notification of cancellations and openings in new restaurants, or alternatively, restaurants frequented by the customer. For example, table management system 140 may alert the customer to a cancellation in his or her favorite restaurant by email or text message, and provide the customer with a period of exclusivity during which the customer may take over the cancelled reservation.

Additionally, table management system 140 may also provide promotional materials to customers that incentivize and increase occupancy during specific periods, such as quiet or slow periods at restaurant 110. For example, table management system 140 may analyze point-of-sale information obtained from restaurant 110 and may identify a peaks time between 11:30 a.m. and 2:00 p.m. and from 4:00 p.m. to 8:00 p.m., and a relatively quiet time between 6:00 p.m. and 6:00 p.m. and after 10:00 p.m. In certain aspects, table management system 140 may provide incentives to customers via email or text message that loyalty rewards, discounts, other benefits to customers seated during quiet times. Table management system 140 may, for example, may provide information to encourage reservations and receive reservations for seating for a discounted menu during the identified quiet times.

In the embodiments described above, table management system 140 may initiate and participate in various two-way communications with communications devices of customers. For example, such communications may include emails and text messages regarding reservations, waitlists, standby lists, promotional materials, incentives, notifications, and alerts. In certain aspects, table management system 140 store communications threads between the customers and table management system 140 within table management data 144B, and additionally or alternatively, data repository 130, in their entireties.

In ether embodiments, table management system 140 may allow customers to establish alerts and notifications regarding cancellations and available tables at one or more "favorite" restaurants. For example, a customer may enjoy dining at a popular restaurant, but may have difficulty obtaining a reservation. In such instances, table management server 140 may allow the customer to establish an alert requesting a text or email notification when space becomes available at the popular restaurant. As described above, a status of the customer with table management system 140 may provide the customer with a period of exclusivity during which the customer may establish a reservation based on the newly available space.

In certain aspects, table management system 140 may enable a customer to not only search for available tables at various restaurants, but to search for available tables at restaurants satisfying various additional criteria, such as a genre of cuisine, specific dishes, average cost, noise level, and geographic region or neighborhood. For example, the customer may search for available tables at restaurants that serve burgers in the Georgetown neighborhood of Washington, D.C. Similarly, queries for available restaurants may be expanded to incorporate for similarities and relationships between menus. For example, a search for available tables at burger joints may return availability at restaurants that also serve hot dogs, due to the relationship between burgers and hot dogs.

Further, in certain aspects, the customer may be provided with customized newsletters that highlight new and/or highly rated restaurants having menus that include items similar to the customer's prior search queries, and additionally or alternatively, prior reviews submitted by the customer. For example, the customer might have indicated in a prior review that he or she enjoyed a specific dish. In such instances table management system 140 may target restaurant recommendations to the customer based on the enjoyment of the specific dish, thus enhancing the efficacy of the recommended restaurants.

In additional embodiments, table management system 140 may enable a restaurant (e.g., restaurant 110) to effectively allocate and manage table and seat inventory within separate seating areas or seating concept. For example, restaurant 110 may include a main dining area, which includes tables of various size and seating configuration, a private dining area, which may accommodate parties of various sizes, and further, a cocktail area including smaller tables that generally experiences shorter turnaround times. In such instances, table management system 140 may enable restaurant 110 to establish reservation rules specific to each of the seating areas and seating concepts. For example, each seating concept may be associated with different requirements for cancellation, different credit card requirements to establish a reservation, and different requirements for minimum party size.

For example, restaurant 110 may include three seating areas disposed on multiple floors. For instance, the ground floor of restaurant 110 may include a noodle bar that is waitlist only and seats hundreds of people a day with quick turnover times. On the second floor of restaurant 110, a main dining area may accept standard reservations, and a private dining area suitable for large-format, family-style meals. In certain aspects, the noodle bar, main dining room, and private dining room may be subject to different reservation rules. For example, large-format meals in the private dining rooms may require booking two days in advance and require that a credit card hold any reservations.

Figure 9:
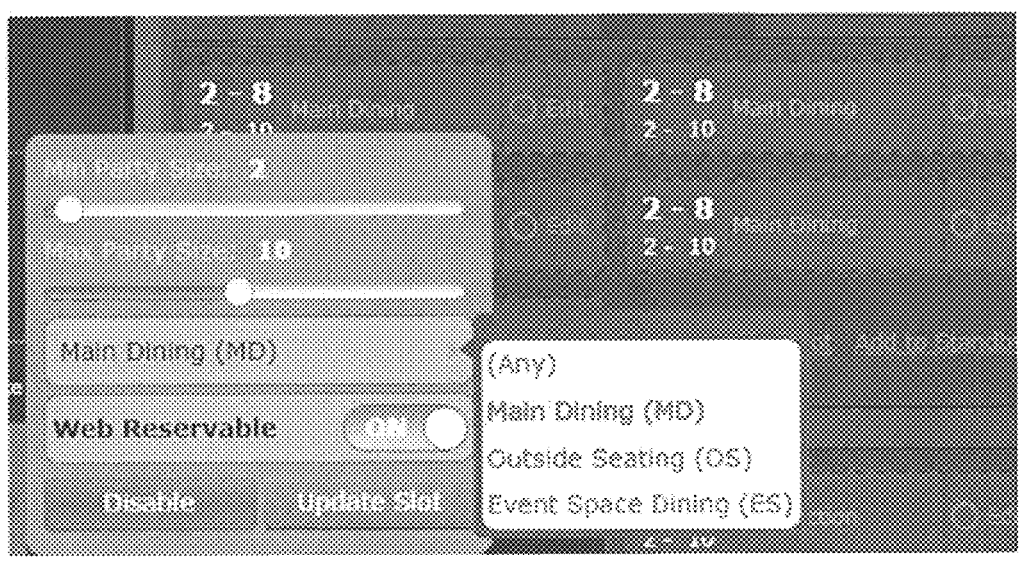

In additional embodiments, table management system may enable a restaurant to modify a configuration of a seating area or concept of restaurant 110. For example, a manager of restaurant 110 may want to reduce an amount of seating in a main dining area during summer months, and may wish to create a new outdoor seating area to include additional inventory. Alternatively, the manager may want to reconfigure the main dining area to accommodate additional tables during periods of especially high activity, such as Valentine's Day and New Year's Eve. In some embodiments, local table management applications 102A and 104A executed by client devices 102 and 104 may enable a manager or other employee of restaurant 110 to modify a configuration of a seating area or concept by modifying information establishing configurable slots (e.g., within slots pane 728A of FIG. 7D). As described, each of the configurable slots represents a table disposed within a portion of the restaurant, and each of the configurable slots may be associated with a minimum party size, a maximum party size, and a corresponding section of restaurant 110. As illustrated in FIG. 9, the manager may modify the configuration of restaurant 110 by a minimum and maximum party size associated with the slot, or by assigning the slot to a different seating area (changing the assignment from "Main Dining" to one of "Outside Seating" or "Event Space Dining").

In further embodiments, table management system 140, in conjunction with client devices 102 and 104, may manage table and seating inventory of restaurant 110 in the context of sales of tickets for tasting events, performances, and other events held at restaurant 110. In certain aspects, table management system 140 (and additionally or alternatively, client devices 102 and 104) may manage reservations for such events (e.g., control the sale of tickets for an event) based on sizes of tables within restaurant 110. For example, table management system 140 may limit a number of tickets available for sale based on a total number of seats available within restaurant 110. In such instances, when a customer buys a dining experience online, the customer may be required to book a table appropriate dining experience, which may be limited based on table availability.

By way of example, a third party (e.g., a charity) may sell thirty tickets for a nightly tasting event held at restaurant 110. In such instances, and absent controls regarding table usage, the sale of the thirty tickets may result in an efficient use of table inventory within restaurant 110. For example, individuals could purchase the tickets with an intention of sitting alone at various tables. In such instances, table management system 140 be integrated into an electronic ticket sale system provided by the charity (e.g., through corresponding API calls) to enforce table and seating constraints at the point of ticket purchase. For example, each purchased ticket may be associated with a particular table or table type in restaurant 110, and the table and seating constraints may prevent individuals from purchasing single tickets.

In other instances, table management system 140 may coordinate shared purchases of tickets by multiple parties. For example, table management system 140 may allow a person to reserve a table of eight tickets when purchasing single ticket, and then allow the person to fill out the rest of the table with subsequent ticket sales to different individuals. The tickets purchased from the different individuals may be associated with the same table, and if a minimum number of tickets for the table are not purchased, table management system 140 may relocate the purchased tickets to a smaller table, or alternatively, revoke the tickets. Table management system 140 may push notifications to client devices 102 and 104 identifying the purchased tickets and corresponding seating requirements, thus enabling client devices 102 and 104 to manage the seating of the party or parties.

In the embodiments described above, restaurant 110 may be associated with multiple client devices (e.g., client devices 102 and 104), which execute corresponding table management applications (e.g., local table management applications 102A and 102B). In certain aspects, individuals operating client devices 102 and 104 may assume different roles in the operation of restaurant 110. For example, client device 102 may correspond to a tablet computer or a smart phone used by a manager to obtain a general understanding of the overall quantity of reservations over the course of a current day. Client device 104 may, in other aspects, correspond to a laptop computer utilized by an assistant manager of restaurant 110 to configure a utilization of table and seating inventory to satisfy the established reservations. In some embodiments, local table management application 102B executed by client device 102 may corresponding to a "light" version of the "full" table management application executed by client device 104.

For example, the manager may user the "light" version of table management application executed by client device 102 to view pertinent information about party size, guest notes, and customer status. In such instances, the "light" version may lack functionality that is available on the "full" version. For example, the "light" version may allow the manager to transfer data from an external reservation system to a local table management system of restaurant 110. In this example, the "light" version presents information received from a third-party reservation system not otherwise automatically added to the local table management system. The manager or host could receive this reservation information and manually or semi-manually change the local system accordingly.

In another embodiment, the "light" version might aid managers who want to monitor the restaurant without using a large device. For example, a manager may desire a high-level understanding of how busy restaurant 110 may be on a given day, and the "light" version may provide a quick snapshot of relevant details, for example, reservations and identifying VIPs.

In certain aspects, client devices executing the "light" and "full" versions of the table management application may be utilized at the same commercial establishment. For example, the "full" version of the application may be used to perform more labor-intensive tasks such as table layout and seating management. The "full" application could also use the same snapshot view used by a "light" version or otherwise provide duplicative functionality.

In some embodiments, the use of the "light" version, either alone or in conjunction with the "full" version, may provide various advantages. For example, the "light" version may be beneficial in certain circumstances in which a smaller device is required or otherwise advantageous. Further, the "light" version may be configured to efficiently use screen real estate (e.g., to account for the smaller screen size) and/or used to focus on higher-level information as opposed to details.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the invention being indicated by the following listing of exemplary claims.

What is claimed is:

1. A computer-implemented method, comprising:
receiving a first request to allocate table inventory at a commercial establishment, the first request comprising a first party size and a first requested time;
determining, based on the received request, an allocation mode associated with the commercial establishment;
determining, using at least one processor, whether one or more first units of table inventory are capable of accommodating the first party size at the first requested time, the determination being based on at least the determined allocation mode; and
in response to determining that one or more first units of table inventory are not capable of accommodating the first party size at the first requested time:
identifying, based on the received first request, a geographic location of a customer associated with the received first request;
determining whether the identified geographic location falls within a threshold distance of the commercial establishment; and
modifying waitlist data for the commercial establishment to include information associated with the received first request in response to determining that the identified geographic location falls within a threshold distance of the commercial establishment, the information comprising the party size and the identified geographic location.

2. The method of claim 1, wherein:
the commercial establishment comprises a restaurant; and
the first units of table inventory comprise tables disposed within the restaurant, the tables being associated with a minimum party size and a maximum party size.

3. The method of claim 2, further comprising:
receiving a second request to allocate table inventory at a commercial establishment, the second request comprising a second party size and a second requested time;
determining, based on the received request, an allocation mode associated with the commercial establishment;
determining, using at least one processor, whether one or more second units of table inventory are capable of accommodating the second party size at the second requested time, the determination being based on at least the determined allocation mode; and
in response to determining that one or more second units of table inventory are capable of accommodating the second party size at the second requested time:
identifying one or more second units of table inventory that are capable of accommodating the second party size at the second requested time, the identification being based on at least the determined allocation mode;
assigning one of the identified tables to the received request; and
generating one or more electronic instructions to transmit a first notification of the assignment to the commercial establishment, the first notification identifying the assigned table, the second requested time, and the second party size.

4. The method of claim 3, wherein;
the second request comprises a request for a reservation at the commercial establishment; and
the assigning comprises generating the requested reservation, the requested reservation being associated with the assigned table, the second party size, the second requested time, and information identifying a customer associated with the requested reservation.

5. The method of claim 4, wherein:
the method further comprises obtaining image data of the customer; and
the first notification includes the obtained image data.

6. The method of claim 4, wherein:
the receiving comprises receiving the request from the customer; and
the method further comprises generating one or more electronic instructions to transmit a second notification of the generated reservation to a device of the customer, the notification comprising at least one of an email message or a text message.

7. The method of claim 1, further comprising computing a waitlist time for the received first request, the computed waitlist time being based on at least one of the allocation mode, reservation data, the second party size, the first requested time, estimated turnover times, rate limiting data, server shift information, commercial establishment schedules, an actual occupancy of tables within the commercial establishment, an expected occupancy of tables within the commercial establishment, external events, or weather data.

8. The method of claim 3, wherein:
the allocation mode corresponds an automated allocation mode; and
the identifying comprises identifying the one or more tables based on at least one of an actual occupancy of tables within the commercial establishment, an expected occupancy of tables within the commercial establishment, the second party size, the second requested time, estimated turnover times, rate limiting data, server shift information, or a commercial establishment schedule.

9. The method of claim 3, wherein:
the allocation mode corresponds an manual allocation mode; and
the identifying comprises identifying the one or more tables based on at least one of candidate slots assigned to the second requested time, reservation data, rate limiting data, server shift information, or a commercial establishment schedule.

10. An apparatus, comprising:
a storage device; and
at least one processor coupled to the storage device, wherein the storage device stores a program for controlling the at least one processor, and wherein the at least one processor, being operative with the program, is configured to:
receive a first request to allocate table inventory at a commercial establishment, the first request comprising a first party size and a first requested time;
determine, based on the received request, an allocation mode associated with the commercial establishment;
determine, using the at least one processor, whether one or more first units of table inventory are capable of accommodating the first party size at the first requested time, the determination being based on at least the determined allocation mode; and
in response to determining that one or more first units of table inventory are not capable of accommodating the first party size at the first requested time:
identifying, based on the received first request, a geographic location of a customer associated with the received first request;
determining whether the identified geographic location falls within a threshold distance of the commercial establishment; and
modifying waitlist data for the commercial establishment to include information associated with the received first request in response to determining that the identified geographic location falls within a threshold distance of the commercial establishment, the information comprising the party size and the identified geographic location.

11. The apparatus of claim 10, wherein:
the commercial establishment comprises a restaurant; and
the first units of table inventory comprise tables disposed within the restaurant, the tables being associated with a minimum party size and a maximum party size.

12. The apparatus of claim 10, wherein:
the received request comprises a request for a reservation at the commercial establishment; and
the at least one processor is further configured to:
receive a second request to allocate table inventory at a commercial establishment, the second request comprising a first party size and a second requested time;
determine, based on the received request, an allocation mode associated with the commercial establishment;
determine, using the at least one processor, whether one or more second units of table inventory are capable of accommodating the second party size at the second requested time, the determination being based on at least the determined allocation mode; and
in response to determining that one or more second units of table inventory are capable of accommodating the second party size at the second requested time:
identifying one or more second units of table inventory that are capable of accommodating the second party size at the second requested time, the identification being based on at least the determined allocation mode;
assigning one of the identified tables to the received request;
generating the requested reservation, the requested reservation being associated with the assigned table, the second party size, the second requested time, and information identifying a customer associated with the requested reservation; and
generating one or more electronic instructions to transmit a first notification of the assignment to the commercial establishment, the first notification identifying the assigned table, the second requested time, and the second party size, and the notification comprising image data of the customer.

13. The apparatus of claim 12, wherein the at least one processor is further configured to:
receive the second request from the customer; and
generate one or more electronic instructions to transmit a second notification of the generated reservation to a device of the customer, the second notification comprising at least one of an email message or a text message.

14. The apparatus of claim 10, wherein the at least one processor is further configured to compute a waitlist time for the received first request, the computed waitlist time being based on at least one of the allocation mode, reservation data, the first party size, the first requested time, estimated turnover times, rate limiting data, server shift information, commercial establishment schedules, an actual occupancy of tables within the commercial establishment, an expected occupancy of tables within the commercial establishment, external events, or weather data.

15. The apparatus of claim 12, wherein:
the allocation mode corresponds an automated allocation mode; and
the at least one processor is further configured to identify the one or more tables based on at least one of an actual occupancy of tables within the commercial establishment, an expected occupancy of tables within the commercial establishment, the second party size, the second requested time, estimated turnover times, rate limiting data, server shift information, or a commercial establishment schedule.

16. The apparatus of claim 12, wherein:
the allocation mode corresponds an manual allocation mode; and
the at least one processor is further configured to identify the one or more tables based on at least one of candidate slots assigned to the second requested time, reservation data, rate limiting data, server shift information, or a commercial establishment schedule.

17. A tangible, non-transitory computer-readable medium storing instructions that, when executed by at least one processor, cause the at least one processor to perform a method comprising:
receiving a first request to allocate table inventory at a commercial establishment, the first request comprising a first party size and a first requested time;
determining, based on the received request, an allocation mode associated with the commercial establishment; and
determining whether one or more first units of table inventory are capable of accommodating the first party size at the first requested time, the determination being based on at least the determined allocation mode; and
in response to determining that one or more first units of table inventory are not capable of accommodating the first party size at the first requested time:
identifying, based on the received first request, a geographic location of a customer associated with the received first request;
determining whether the identified geographic location falls within a threshold distance of the commercial establishment; and
modifying waitlist data for the commercial establishment to include information associated with the received first request in response to determining that the identified geographic location falls within a threshold distance of the commercial establishment, the information comprising the party size and the identified geographic location.

* * * * *